(12) United States Patent
Hendry et al.

(10) Patent No.: US 8,856,456 B2
(45) Date of Patent: Oct. 7, 2014

(54) SYSTEMS, METHODS, AND DEVICES FOR CACHE BLOCK COHERENCE

(75) Inventors: Ian C. Hendry, San Jose, CA (US); Jeffry Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 664 days.

(21) Appl. No.: 13/157,104

(22) Filed: Jun. 9, 2011

(65) Prior Publication Data
US 2012/0317362 A1 Dec. 13, 2012

(51) Int. Cl.
*G06F 12/08* (2006.01)

(52) U.S. Cl.
CPC ...... *G06F 12/0831* (2013.01); *G06F 2212/302* (2013.01); *G06F 2212/301* (2013.01)
USPC .................................. 711/146; 711/E12.002

(58) Field of Classification Search
USPC ........................................... 711/146, E12.002
See application file for complete search history.

(56) References Cited

U.S. PATENT DOCUMENTS

| 7,305,524 | B2 | 12/2007 | Hoover et al. | |
|---|---|---|---|---|
| 2004/0003184 | A1* | 1/2004 | Safranek et al. | 711/146 |
| 2005/0027946 | A1* | 2/2005 | Desai | 711/146 |
| 2007/0079074 | A1 | 4/2007 | Collier et al. | |
| 2008/0183972 | A1 | 7/2008 | Dieffenderfer | |
| 2009/0006770 | A1* | 1/2009 | Blumrich et al. | 711/146 |
| 2009/0158022 | A1* | 6/2009 | Radhakrishnan et al. | 713/2 |
| 2009/0187713 | A1 | 7/2009 | Zedlewski et al. | |
| 2009/0248983 | A1 | 10/2009 | Offen et al. | |
| 2009/0327616 | A1* | 12/2009 | Conway et al. | 711/146 |
| 2010/0235586 | A1 | 9/2010 | Gonion | |

FOREIGN PATENT DOCUMENTS

| KR | 200325296 A | 3/2003 |
|---|---|---|
| WO | 0217102 A2 | 2/2002 |

OTHER PUBLICATIONS

Patel A., et al: "Energy-efficient MESI cache coherence with proactive snoop filtering for multicore microprocessors", Low Power Electronics and Design (ISLPED), 2008 ACM/IEEE International Symposium on, IEEE, Piscataway, NJ, USA, Aug. 11, 2008, pp. 247-252.

Cantin J F, et al: "Improving Multiprocessor Performance with Coarse-Grain Cherence Tracking", Computer Architecture, 2005. ISCA '05. Proceedings. 32nd International Syposium on Madison, WI, USA Jun. 4-8, 2005, Piscataway, NJ, USA, IEEE, Jun. 4, 2005, pp. 246-257.

(Continued)

*Primary Examiner* — Edward Dudek, Jr.
*Assistant Examiner* — Ralph A Verderamo, III
(74) *Attorney, Agent, or Firm* — Fletcher Yoder PC

(57) ABSTRACT

Systems, methods, and devices for efficient cache coherence between memory-sharing devices are provided. In particular, snoop traffic may be suppressed based at least partly on a table of block tracking entries (BTEs). Each BTE may indicate whether groups of one or more cache lines of a block of memory could potentially be in use by another memory-sharing device. By way of example, a memory-sharing device may employ a table of BTEs that each has several cache status entries. When a cache status entry indicates that none of a group of one or more cache lines could possibly be in use by another memory-sharing device, a snoop request for any cache lines of that group may be suppressed without jeopardizing cache coherence.

28 Claims, 19 Drawing Sheets

(56) References Cited

OTHER PUBLICATIONS

Moshovos A: "RegionScout: Exploiting Coarse Grain Sharing in Snoop-Based Coherence", Jun. 4, 2005, Computer Architecture, 2005. ISCA '05. Proceedings. 32nd International Symposium on Madison, WI, USA Jun. 4-8, 2005, Piscataway, NJ, USA, IEEE, pp. 234-245.

"Energy-Efficient MESI Cache Coherence with Pro-active Snoop Filtering for Multicore Microprocessors," Low Power Electronics and Design (ISLPED), 2008 ACM/IEEE International Symposium, Aug. 11-13, 2008; pp. 247.

International Search Report and Written Opinion for PCT No. PCT/US12/41400 dated Aug. 10, 2012; 11 pages.

Advel Patel et al.; "Energy Efficient MESI Cache Coherence with Pro-Active Snoop Filtering for Multicore Microprocessors," 2008 ACM/IEEE International Symposium on Low Power Electronics and Design (ISLPED), Aug. 11, 2008; pp. 247-252; XP031717852, ISBN:978-1-4244-8634-2.

James F. Cantin, et al.; "Improving Multiprocessor Performance with Coarse Grain Coherence Tracking," Proceedings of the 32nd International Symposium on Computer Architecture (ISCA'05), Jun. 4, 2005; pp. 246-257; XP008156223, ISBN: 978-0-7695-2270-8.

A. Moshovos; "RegionScout: Exploiting Coarse Gran Sharing in Snoop-Based Coherence," Proceedings of the 32nd International Symposium on Computer Architecture (SCA'05), Jun. 4, 2005; pp. 234-245; XP008139718; ISBN: 978-0-7695-2270-8.

Examination Report for European Application No. 12171294.7 dated Nov. 8, 2013; 5 pgs.

\* cited by examiner

SYSTEMS, METHODS, AND DEVICES FOR CACHE BLOCK COHERENCE

BACKGROUND

The present disclosure relates generally to cache coherence and, more particularly, to techniques for effectively maintaining cache coherence between devices by tracking whether groups of one or more cache lines are possibly in use.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices with multiple processors or other memory-sharing devices frequently employ cache coherence techniques to maintain the integrity of shared memory. Common cache coherence techniques may involve bus snooping, in which one processor may communicate snoop requests to another before accessing the desired memory. Such cache coherence techniques may produce acceptable results when processors operate on relatively moderate memory bandwidths. When one or more of the processors is a memory-sharing device that employs a particularly high memory bandwidth (e.g., a graphics processing unit, or GPU), however, excessive snoop traffic may result. For this reason, high-bandwidth devices such as GPUs are typically made non-coherent with other memory-sharing devices in the electronic device. Unfortunately, non-coherent devices may require specially written software to manage their non-coherent memory. As such, the use of high-performance, high-bandwidth processors for general computing tasks may be limited. For example, general processing on GPUs may require specialized programs written with explicit memory buffer management, which may be unappealingly taxing to software developers.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to techniques for efficiently maintaining cache coherence between memory-sharing devices, such as central processing units (CPUs) and graphics processing units (GPUs). For example, present embodiments may not merely involve issuing cache line snoop requests simply according to a conventional cache coherent protocol (e.g., MESI, MOSI, MOESI, and so forth), which could result in overwhelming snoop traffic. Rather, cache coherence may be maintained more efficiently by suppressing snoop traffic when a desired cache line could not possibly be in use by another memory-sharing device. To determine which snoop traffic to suppress, present embodiments may track whether groups of one or more cache lines in blocks of memory are possibly in use by the other processor. In particular, a memory-sharing device may employ a table of "block tracking entries (BTEs)," each BTE indicating whether groups of one or more cache lines of a block of memory could potentially be in use by another memory-sharing device. Specifically, each BTE may include a number of "cache status entries" that respectively note whether one or more cache lines could potentially be in use by one or more other memory-sharing devices (e.g., "line-snoop-required" or "no-line-snoop-required").

The block tracking entry (BTE) table may prevent a significant portion of unnecessary snoop traffic, allowing for much more efficient cache coherence. For example, if a valid BTE indicates a cache line as no-line-snoop-required, the memory-sharing device may access the cache line from shared memory without broadcasting any snoop requests. Otherwise, the memory-sharing device may broadcast a cache line snoop request to ensure cache coherence. By way of example, a memory-sharing device may employ a table of BTEs that each has several cache status entries. When a cache status entry indicates that none of a group of one or more cache lines could possibly be in use by another memory-sharing device, a snoop request for any cache lines of that group may be suppressed without jeopardizing cache coherence.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
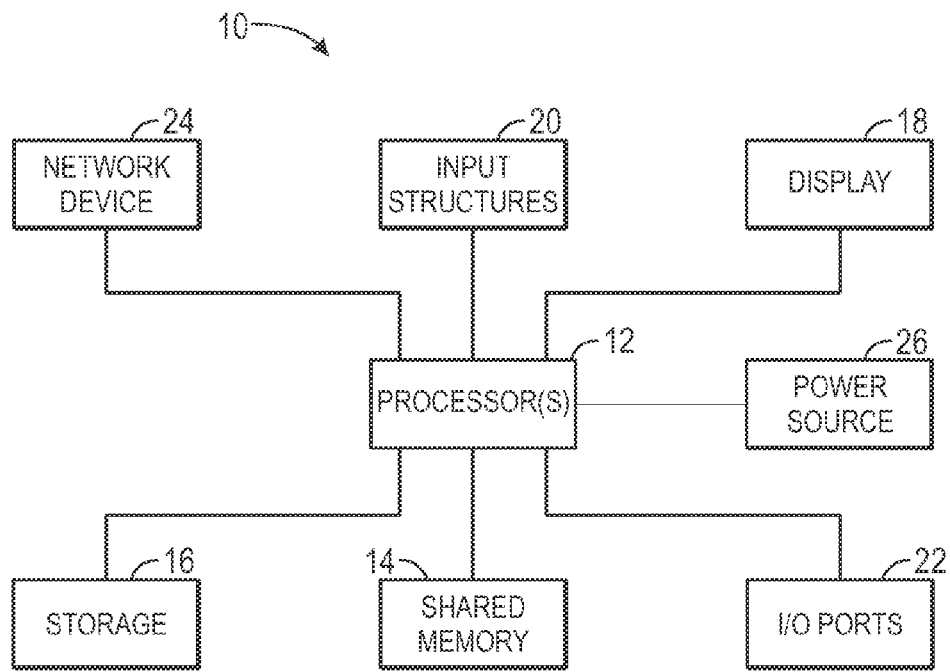
FIG. 1 is a block diagram of an electronic device that maintains cache coherence between two memory-sharing devices, at least one of which may be a relatively high-bandwidth memory-sharing device, such as a GPU, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, embodiments of the present disclosure relate to techniques for efficiently maintaining cache coherence by memory-sharing devices, such as central processing units (CPUs) and graphics processing units (GPUs), even when one or more of the memory-sharing devices consumes a relatively high bandwidth of memory (e.g., 100 GB/s or higher, especially across PCIe). For example, present embodiments may not merely involve issuing cache line snoop requests according to a conventional cache coherent protocol (e.g., MESI, MOSI, MOESI, and so forth), which could result in overwhelming snoop traffic when large swaths of memory are being continually turned over. This rapid turnover of large swaths of memory could occur frequently in a cache of a high-bandwidth memory-sharing device, such as a GPU. Rather, cache coherence may be maintained more efficiently by suppressing certain snoop traffic when it may be determined that a desired cache line could not possibly be in use by another memory-sharing device. To determine which snoop traffic to suppress, present embodiments may track whether groups of one or more cache lines in blocks of memory are possibly in use by the other processor. Such a block of memory may or may not be a contiguous block of memory.

In particular, each memory-sharing device may employ a "snoop suppression block" that maintains a table of "block tracking entries (BTEs)." This table of BTEs may be referred to as a "BTE table." As used herein, it should be appreciated that such a snoop suppression block may be implemented as a hardware component of the memory-sharing device or as some form of machine-readable instructions, such as firmware or software. It is believed that the snoop suppression block will be much more efficient, however, when implemented in hardware. The BTE table may represent a collection of BTEs, each of which indicates whether groups of one or more cache lines of a block of memory could potentially be in use by another memory-sharing device. That is, each BTE may include a number of "cache status entries," each cache status entry indicating whether one or more cache lines could potentially be in use by one or more other memory-sharing devices. Specifically, each cache status entry may indicate whether a group of one or more cache lines are "line-snoop-required" or "no-line-snoop-required."

Whether a cache status entry indicates that a group of one or more cache lines should be indicated as line-snoop-required or no-line-snoop-required may depend on an underlying cache coherence protocol that is in use. For example, it is contemplated that for the MESI protocol, which provides cache coherence states of modified, exclusive, shared, and invalid, a cache status entry may indicate a group of one or more cache lines to be line-snoop-required when at least one of the one or more cache lines of the group is or could be held in the modified, shared, or exclusive state by another memory-sharing device. Likewise, a cache status entry may indicate that the group of one or more cache lines is no-line-snoop-required when all of the cache lines of the group are in a state in which they could not be accessed or modified without the knowledge of the memory-sharing device. Thus, if a second memory-sharing device could possibly access a given cache line without first informing a first memory-sharing device (e.g., via a cache line snoop request), a cache status entry of a BTE associated with the first memory-sharing device will not list a group that includes that cache line as no-line-snoop-required.

The block tracking entry (BTE) table in the snoop suppression block of the memory-sharing device may prevent a significant portion of unnecessary snoop traffic, allowing for much more efficient cache coherence. For example, when the memory-sharing device seeks access to a cache line of memory not immediately present in its local cache, in an event termed a "cache miss," the memory-sharing device may not necessarily broadcast a cache line snoop request for the desired cache line. Rather, if the snoop suppression block determines that a block tracking entry (BTE) of its BTE table indicates the cache line as no-line-snoop-required, the memory-sharing device may access the cache line from shared memory without broadcasting any snoop requests. If the BTE table of the snoop suppression block lacks a BTE having a cache status entry that indicates a status of the desired cache line or, if the BTE table contains a BTE with a cache status entry that indicates that the desired cache line is line-snoop-required, the memory-sharing device may broadcast a cache line snoop request to ensure cache coherence.

Sending out a cache line snoop request may be used to efficiently populate the block tracking entry (BTE) table of the snoop suppression block of the memory-sharing device. In particular, because accessing a desired cache line generally may precede accessing other cache lines nearby the desired cache line in shared memory, other memory-sharing devices that receive a cache line snoop request may respond to such a cache line snoop request by providing a BTE that conservatively lists the status of a block of cache lines that includes the desired cache line, alternatively or in addition to a conventional cache-line snoop response. In this way, if other memory-sharing devices are not using a particular cache line or those cache lines in a block of memory that contains the cache line, a memory-sharing device that issues a cache line snoop request may receive a BTE indicating as much. Accordingly, because the BTE table of the snoop suppression block of the memory-sharing device may list these other cache lines as no-line-snoop-required, upon a cache miss of these other cache lines, the memory-sharing device may access these other cache lines directly in the shared memory without broadcasting any additional cache line snoop requests.

As will be described in greater detail below, the present disclosure provides a variety of embodiments for employing and populating a block tracking entry (BTE) table in such a snoop suppression block of a memory-sharing device. As noted above, electronic devices that employ at least one high-bandwidth memory-sharing device, such as a graphics processing unit (GPU), may benefit particularly by maintaining cache coherence more efficiently according to the present disclosure. However, it should be understood that even electronic devices with only relatively low-bandwidth memory-sharing devices are believed to benefit from the present techniques.

Figure 2:
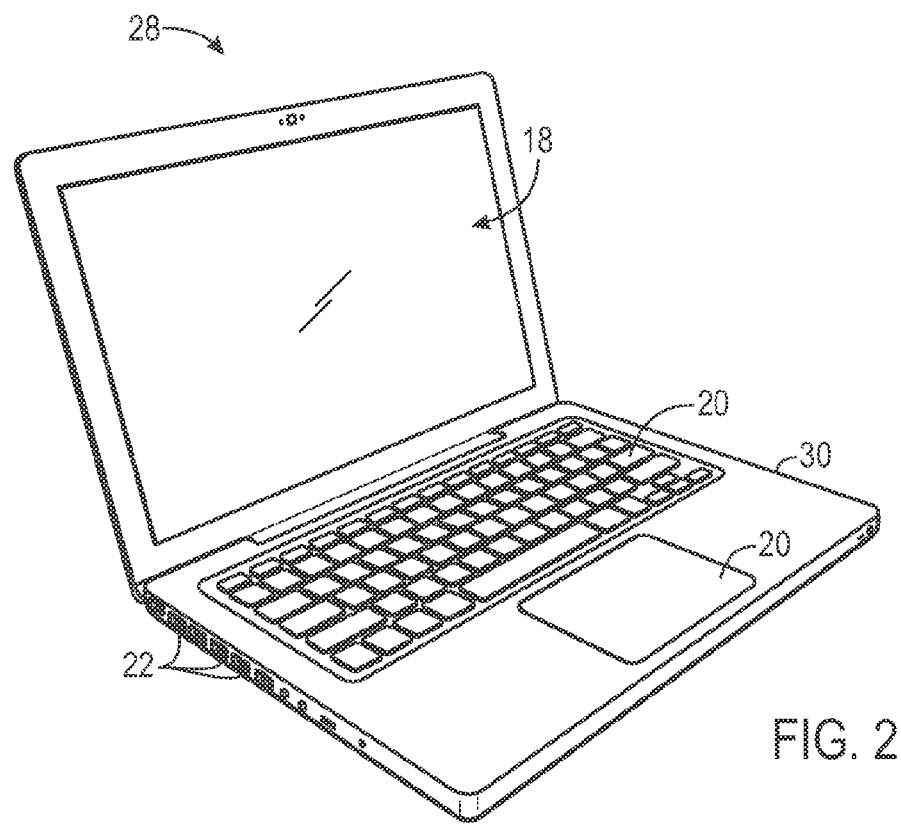
FIG. 2 is a perspective view of the electronic device of FIG. 1 in the form of a notebook computer, in accordance with an embodiment.

With the foregoing in mind, a general description of suitable electronic devices capable of employing the disclosed memory coherence techniques is provided below. In FIG. 1, a block diagram depicting various components that may be present in electronic devices suitable for use with the present techniques is provided. In FIG. 2, one example of a suitable electronic device, here provided as a notebook computer system, is depicted. These types of electronic devices, and other electronic devices having comparable memory management capabilities, may be used in conjunction with the present techniques.

FIG. 1 is a block diagram illustrating various components and features of an electronic device 10 capable of performing the techniques disclosed herein. In the presently illustrated embodiment, such components may include two or more processors 12, memory 14, nonvolatile storage 16, a display 18, input structures 20, input/output (I/O) ports 22, a networking device 24, and a power source 26.

The processors 12 may include at least two processors, which may or may not have heterogeneous capabilities. By way of example, one of the processors 12 may be a central processing unit (CPU) with a relatively low characteristic memory usage rate and/or bandwidth, and another of the processors 12 may be a graphics processing unit (GPU) with a relatively higher characteristic memory usage rate and/or bandwidth. Although the present disclosure provides various examples of the present techniques using a CPU and a GPU to represent heterogeneous processors, it should be understood that any other suitable memory-sharing devices may be used (e.g., streaming processors, network controllers, and so forth). In the example of FIG. 1, at least one of the processors 12 may enable the operation of an operating system (OS), which may allocate virtual memory resources to software running on the OS. The virtual memory may correspond to actual hardware locations in the memory 14 and/or nonvolatile storage 16. The OS running on the processors 12 may also perform certain techniques for maintaining memory coherence for memory resources shared between the processors 12, as described below with reference to FIG. 14. Additionally or alternatively, one or more memory management units (MMUs) of the processors 12 may coordinate inter-processor communication to efficiently maintain cache coherence between the heterogeneous processors. At least one of the processors 12 may include a table of block tracking entries (BTEs), which may track whether groups of one or more cache lines in blocks of memory are possibly in use by another other of the processors 12.

The memory 14 may store instructions for carrying out certain aspects of the present techniques described herein. These instructions may be stored, at least temporarily, in the memory 14 and may be executed by one or more of the processors 12. Such instructions may also be stored in the nonvolatile storage 16, which may include, for example, a hard disk drive or Flash memory. The display 18 may display elements of the OS or software, such as the user interface (UI) of the electronic device 10. A user may interact with the electronic device 10 via the input structures 20, which may include a keyboard and/or a mouse or touchpad. In certain embodiments, the display 18 may be a touchscreen display that serves as one of the input structures 20.

The I/O ports 22 of the electronic device 10 may enable the electronic device 10 to transmit data to and receive data from other electronic devices 10 and/or various peripheral devices, such as external keyboards or mice. The networking device 24 may enable personal area network (PAN) integration (e.g., Bluetooth), local area network (LAN) integration (e.g., Wi-Fi), and/or wide area network (WAN) integration (e.g., 3G). The power source 26 of the electronic device 10 may be any suitable source of power, such as a rechargeable lithium polymer (Li-poly) battery and/or alternating current (AC) power converter.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, IMac®, Mac® mini, or Mac Pro® available from Apple Inc. By way of example, the electronic device 10, taking the form of a notebook computer 28, is illustrated in FIG. 2 in accordance with one embodiment of the present disclosure. The depicted computer 28 may include a housing 30, a display 18, input structures 20, and I/O ports 22. In one embodiment, the input structures 20 (such as a keyboard and/or touchpad) may be used to interact with the computer 28, such as to start, control, or operate a GUI or applications running on computer 28. For example, a keyboard and/or touchpad may allow a user to navigate a user interface or application interface displayed on display 10.

In the system described above with reference to FIGS. 1 and 2, the processors 12 may maintain cache coherence efficiently by tracking whether groups of one or more cache lines in blocks of memory are possibly in use by another of the processors 12. As shown by a two-processor configuration 40 of FIG. 3, two processors 12A and 12B may respectively share cache lines of shared memory 14 via one or more memory buses 42. The processors 12A and 12B may communicate with each other via the memory bus 42 or via a communication bus 44. In the two-processor configuration 40 of FIG. 3, the processors 12A may be homogeneous or heterogeneous. That is, one or both of the processors 12A and 12B may be relatively low-bandwidth memory-sharing devices, such as central processing units (CPUs), or one or both of the processors 12A or 12B may be a relatively high-bandwidth memory-sharing devices, such as graphics processing units (GPUs). For the following discussion, the first processor 12A may be a central processing unit (CPU) and the second processor 12B may be a graphics processing unit (GPU). As such, at any given time, the first processor 12A may typically operate on significantly smaller chucks of memory than the second processor 12B.

As noted above, the first processor 12A and the second processor 12B both may share access to the shared memory 14 via one or more memory buses 42. As will be discussed below, the processors 12A and 12B may issue various communications to one another by way of the one or more memory buses 42 and/or the communication bus 44. Such communications may include cache line snoop requests, cache line snoop responses, block tracking entry (BTE) requests, and/or BTE responses. The operation of these communications will be discussed in greater detail below.

Figure 3:
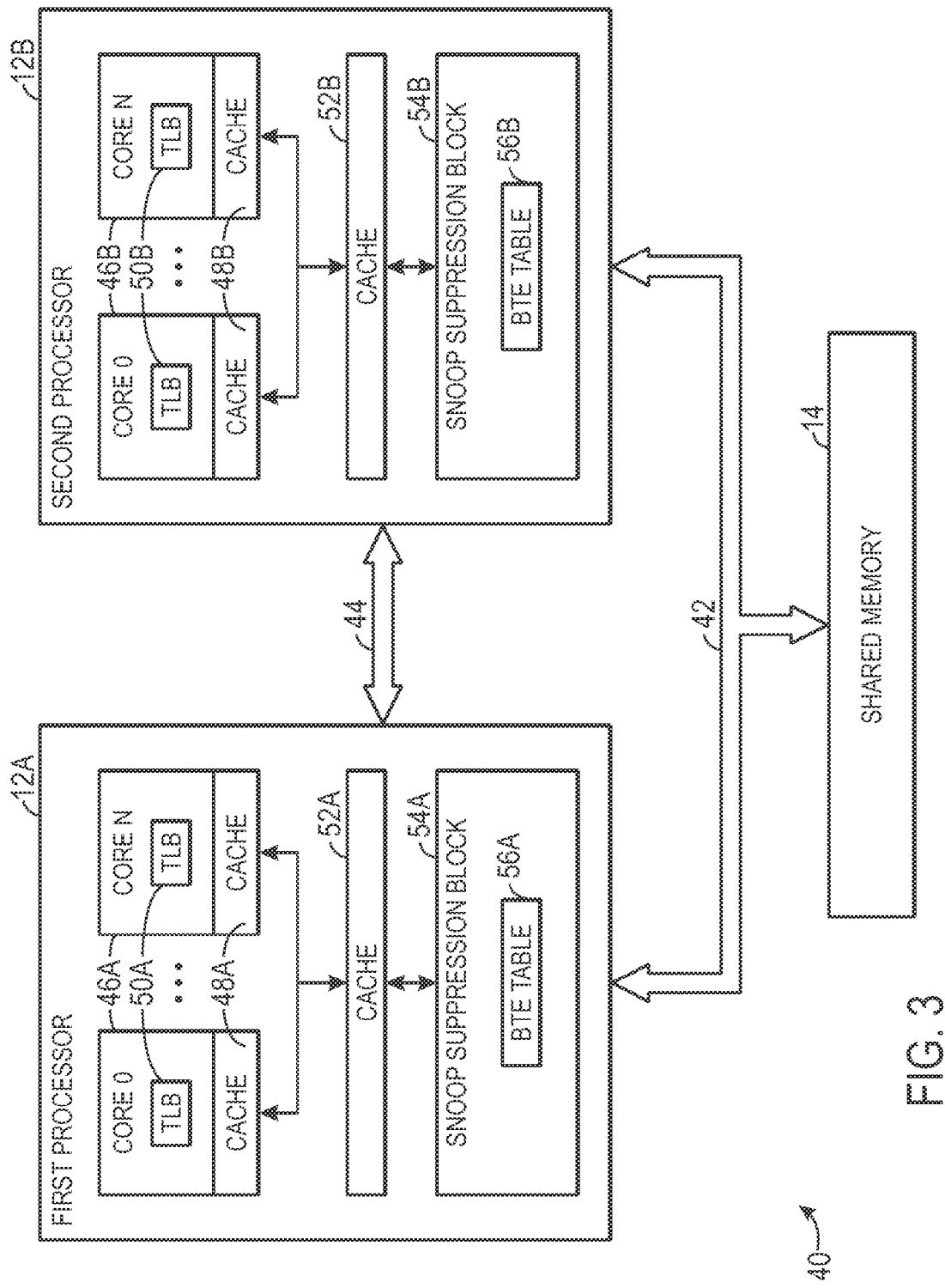
FIG. 3 is a schematic block diagram of two processors capable of efficiently maintaining cache coherence using tables of block tracking entries that track whether groups of one or more cache lines in a block of memory are possibly in use by the other processor, in accordance with an embodiment.

The first processor 12A, which may be central processing unit (CPU), may include any suitable number of processor cores 46A, illustrated as 0 to N, each of which may operate on cache lines stored in a low-level cache 48A. The processor cores 46A also may include a memory management unit and/or a translation lookaside buffer (TLB) component 50A. A processor-level cache 52A may store cache lines available to be shared by all of the processor cores 46A. In some embodiments, the first processor 12A may include only the low-level caches 48A or only the processor-level caches 52A. TLB components 50A may translate virtual memory addresses of virtual memory allocated by a virtual memory management component of an operating system (OS) running on the first processor 12A into physical addresses used by the caches 48A and 52A and the shared memory 14. When a processor core 46A seeks access to a cache line of memory not present in its low-level cache 48A or the processor-level cache 52A, the first processor 12A may attempt to load the cache line from elsewhere, namely, from the shared memory 14 or from another cache 52A from another processor 12B. As seen in FIG. 3, the second processor 12B also may include processor cores 46B with respective low-level caches 48B, a memory management unit and/or translation lookaside buffer (TLB) component 50B, and processor-level caches 52B. These elements of the second processor 12B may operate in a similar manner to those of the first processor 12A, except that they may be designed to operate on a higher bandwidth of memory at any given time.

To efficiently maintain cache coherence between the processors 12A and 12B, the first processor 12A may include a snoop suppression block 54A that contains a block tracking entry (BTE) table 56A and the second processor 12B may include a snoop suppression block 54B with a BTE table 56B. As will be described in greater detail below, the snoop suppression blocks 54A and/or 54B may reduce snoop traffic between the first processor 12A and the second processor 12B by preventing certain cache line snoop requests from being broadcast, freeing up processor cycles and communication bandwidth on the memory bus 42 or communication bus 44. The two-processor configuration 40 of FIG. 3 may generally employ any suitable cache coherence protocol, such as MESI, MOSI, MOESI, and so forth. Such a cache coherence protocol may be used in conjunction with the snoop suppression blocks 54A and 54B to efficiently maintain cache coherence between the processors 12A and 12B.

The following discussion may elucidate how block tracking entries (BTEs) may be used to maintain cache coherence between two memory-sharing devices (e.g., the first processor 12A and the second processor 12B) while reducing the amount of snoop traffic needed to maintain cache coherence. For ease of explanation, in the examples that follow, the first processor 12A is described as a memory-sharing device that sends snoop requests, and the second processor 12B is described as a memory-sharing device that replies with snoop responses. However, it should be clear that, additionally or alternatively, the second processor 12B may be a memory-sharing device that sends snoop requests and the first processor 12A may be a memory-sharing device that replies with snoop responses.

Figure 4:
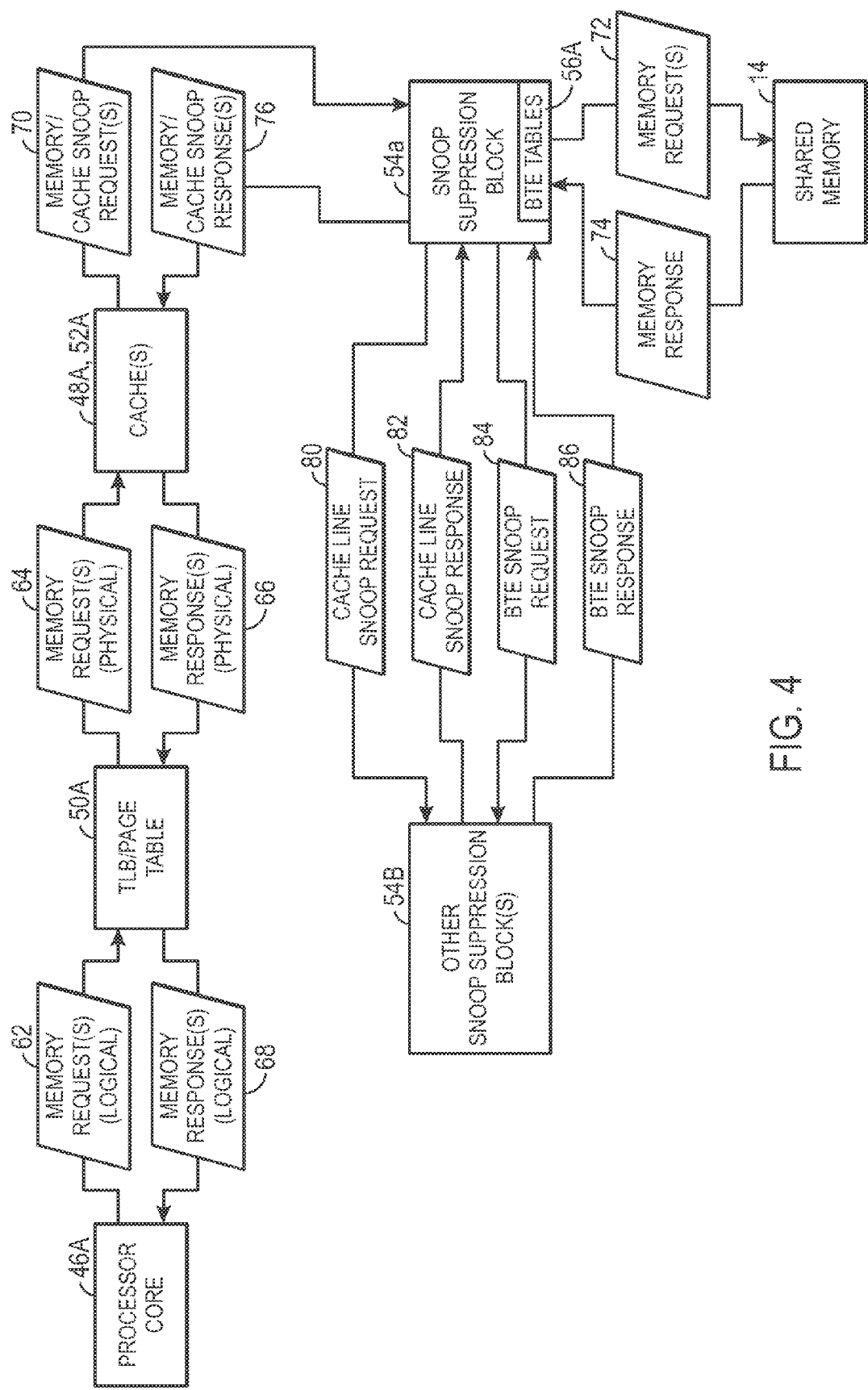
FIG. 4 is a schematic flow diagram representing communication that may take place when one of the processors illustrated in FIG. 3 requests memory, in accordance with an embodiment.

A flow diagram 70 of FIG. 4 represents one manner in which the snoop suppression block 54A of the first processor 12A may efficiently prevent unnecessary snoop traffic from the first processor 12A to the second processor 12B. As shown in the flow diagram 60 of FIG. 4, when a processor core 46A requests access to a data element contained in memory, the processor core 46A may issue a memory request in a logical memory address, as assigned by a virtual memory management component of an operating system (OS) running on the processor 12A. The translation look aside buffer (TLB) component 50A and/or a page table associated with the TLB component 50A may translate the logical address into a physical address, issuing a physical memory request 64 to the cache 48A associated with the processor core 46A or to the cache processor-level cache 52A. If a valid copy of the cache line indicated by the physical memory request 64 is present in the cache 48A or 52A, in an event termed a "cache hit," a physical memory response 66 containing the requested cache line data may be returned, and provided to the processor core 46A as a logical memory response 68.

If the physical memory request 64 requests a cache line for which a valid copy is not present in the caches 48A and/or 52A, in an event termed a "cache miss," the processor 12A may attempt to obtain the desired cache line from the shared memory 14 or from another processor 12 (e.g., the second processor 12B). To do so, a memory and/or cache line snoop request 70 may be provided by any suitable components of the processor 12A, which may be the cache 52A and some embodiments. The snoop suppression block 54A may preclude certain unnecessary snoop traffic, which might otherwise overwhelm the ability of the second processor 12B to handle snoop traffic. In particular, the snoop suppression block 54A may determine whether the block tracking entry (BTE) table 56A indicates that the cache line status is no-line-snoop-required, which means that the cache line will not be accessed or used by the second processor 12B without first issuing some sort of indication to the first processor 12A. If the BTE table 56A of the snoop suppression block 54A indicates that the requested cache line is a no-line-snoop-required cache line, the snoop suppression block 54A may issue a memory request 72 to obtain the requested cache line from the shared memory 14 without issuing a snoop request to any other memory-sharing devices. The shared memory 14 may reply with a memory response 74 containing the cache line data. The snoop suppression block 54A may pass on the cache line data from the memory response 74 in a memory response 76, which may be eventually returned to the processor core 46A as a logical memory response 68 and/or stored in the cache 48A and/or 52A.

When the requested cache line is listed as line-snoop-required in the BTE table 56A, or when the BTE table 56A lacks a valid BTE corresponding to the requested cache line, the snoop suppression block 54A may not suppress any snoop requests for the desired cache line. Indeed, the snoop suppression block 54A may issue a snoop request to other memory sharing devices (e.g., to the snoop suppression block 54B of the second processor 12B). For example, the snoop suppression block 54A may issue a cache line snoop request 80, receiving in return a cache line snoop response 82. The snoop suppression block 54A, additionally or alternatively, also may issue a block tracking entry (BTE) snoop request 84, receiving a BTE snoop response 86 in return. The cache line snoop responses 82 and/or BTE snoop response 86 may be used by the snoop suppression block 54A to populate the BTE table 56A, allowing the snoop suppression block 54A to efficiently eliminate some unnecessary snoop traffic from the processor 12A to the processor 12B. Various combinations of these communications may be issued and replied to, as will be discussed in greater detail below with reference to FIGS. 8-21, for example.

It should be understood that the BTE tables 56A and/or 56B need not be located physically within their respective processor 12A or 12B. Rather, the BTE tables 56A and/or 56B need only be associated with their respective processor 12A or 12B such that the processor 12A or 12B can determine when snoop requests can be suppressed without jeopardizing cache coherence. In some embodiments, the BTE tables 56A and/or 56B are implemented in hardware within respective snoop suppression blocks 54A and 54B, as illustrated. In other embodiments, the BTE tables 56A and/or 56B may be implemented using some form of processor-executable instructions running on one or more of the processors 12.

To provide a few examples before continuing further, when the snoop suppression block 54A issues a cache line snoop request 80 for the requested cache line that is not present in a cache 48B and/or 52B, the other snoop suppression block 54B may reply with a BTE snoop response 86 or may not reply at all. When the other snoop suppression block 54B replies to a cache line snoop request 80 with only a BTE snoop response 86, it may signify to the snoop suppression block 54A that the requested cache line is not in use by the second processor 12B. When the other snoop suppression block 54B does not provide any reply to a cache line snoop request 80 or a BTE request 84, it may signify to the snoop suppression block 54A that all cache lines in a block of memory that includes the requested cache line should be marked as line-snoop-required in the BTE table 54A.

Figure 5:
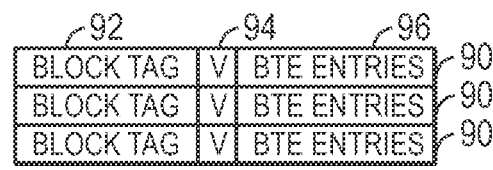
FIG. 5 is a schematic block diagram of a table of block tracking entries (BTEs) that track whether groups of one or more cache lines in a block of memory are possibly in use by another memory-sharing device, in accordance with an embodiment.

As indicated above, a block tracking entry (BTE) table 56 in a snoop suppression block 54 may not merely track recently snooped cache lines, but rather may track blocks of cache lines to determine when cache line snoop requests may be suppressed. One example of such a BTE table 56 appears in FIG. 5. The BTE table 56 of FIG. 5 includes a number of block tracking entries (BTEs) 90. Each BTE 90 may track a block of cache lines. As such, a block tag 92 may represent one component of the BTE 90, generally corresponding, as will be discussed further below, to a portion of a physical memory address used by a cache line (e.g., some number of the most significant bits (MSBs) of a cache tag). A validity flag 94 may indicate whether the BTE 90 is valid or invalid as a whole. Whether the validity flag 94 is set to indicate that the BTE 90 is valid or invalid may be defined according to any suitable technique, including those techniques disclosed herein. Each BTE 90 may include a number of cache status entries 96, each entry corresponding to a status of a group of one or more cache lines. The BTEs 90 of the BTE table 56 may added and removed, or be aged out over time, according to any suitable techniques.

Figure 6:
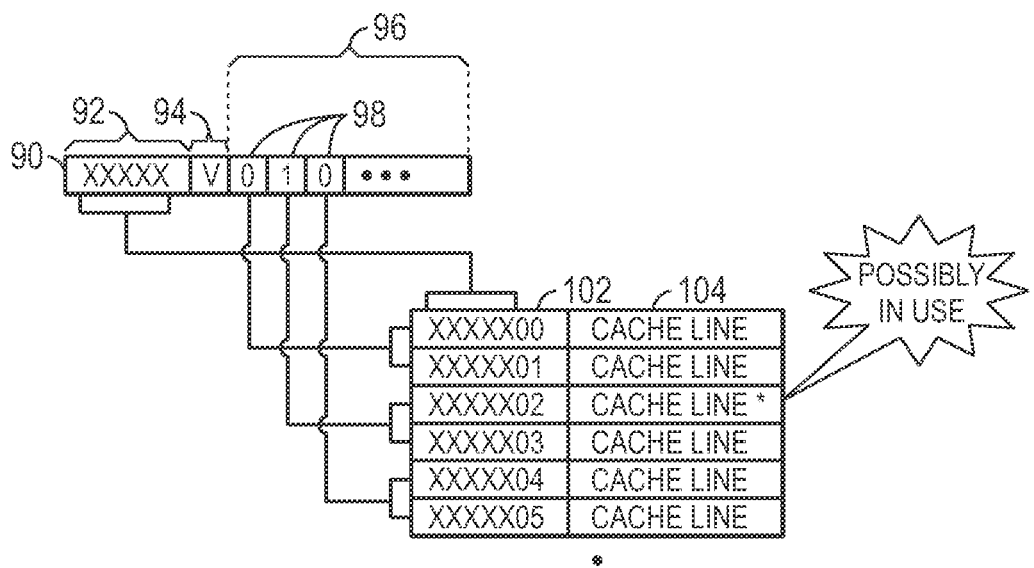
FIG. 6 is a schematic block diagram representing one manner in which a block tracking entry (BTE) may track whether groups of one or more cache lines in a block of memory are possibly in use by another memory-sharing device, in accordance with an embodiment.

These various components of a BTE 90 are illustrated in FIG. 6. The cache status entries 96 may include any suitable number of slots 98, each of which may represent a single cache status entry 96 of the BTE 90. Each of the cache status entries 96 may correspond to one or more cache lines 100, illustrated in FIG. 6 to include a cache line address 102 and cache line data 104. The cache line data 104 may be accessible at the cache line address 102. The block tag 92 of the BTE 90 may correspond to certain bits (e.g., some number of most significant bits (MSBs)) of the cache line addresses 102, thereby identifying a block of cache lines to which the BTE 90 may correspond.

In the example of FIG. 6, each cache status entry 96 corresponds to two cache lines 100 in the block of cache lines tracked by the BTE 90 and identified by the block tag 92. For example, a cache status entry 96 having a logical value of zero may indicate that all cache lines 100 corresponding to that cache status entry 96 are no-line-snoop-required (and, consequently, that cache line snoop requests for these cache lines may be suppressed). On the other hand, a cache status entry 96 with an opposite logical value, such as the cache status entry 96 storing a logical value of one, may indicate that at least one of the cache lines 100 to which it corresponds could potentially be in use or otherwise accessed or modified by another memory-sharing device (thus requiring some form of snoop communication before these cache lines 100 should be accessed).

As shown in the example of FIG. 6, each of the cache status entries 96 corresponds to two cache lines 100. It should be appreciated that, in alternative embodiments, each cache status entry 96 may track any suitable number of cache lines 100 (e.g., one, two, three, four, five, six, or more cache lines 100). When each cache status entry 96 corresponds to two cache lines 100, and each BTE 90 includes, for example, 128 cache status entries 96, each BTE 90 will track 256 cache lines 100 (i.e., 4 KB memory per BTE 90). As will be discussed further below with reference to FIGS. 24-29, in some embodiments, the granularity of the cache status entries 96 may vary from BTE 90 to BTE 90. For example, the cache status entries 96 of a BTE 90 may be relatively finer-grained, each tracking relatively fewer cache lines 100, when such cache lines 100 are under a relatively higher amount of contention between the processors 12. Likewise, the cache status entries 96 of a BTE 90 may be relatively coarser-grained, each tracking relatively more cache lines 100, when such cache lines 100 are under a relatively lower amount of contention between the processors 12. Although the following examples discuss varying the granularity of BTEs 90 based on contention, contention represents just one example basis for doing so. Many other bases for varying BTE 90 granularity are possible. For example, a BTE 90 may be relatively coarser-grained than otherwise when the block of memory tracked by the BTE 90 is unlikely to be accessed by a different processor 12 (e.g., the block of memory is in a register set that is divided among various processors 12).

Figure 7:
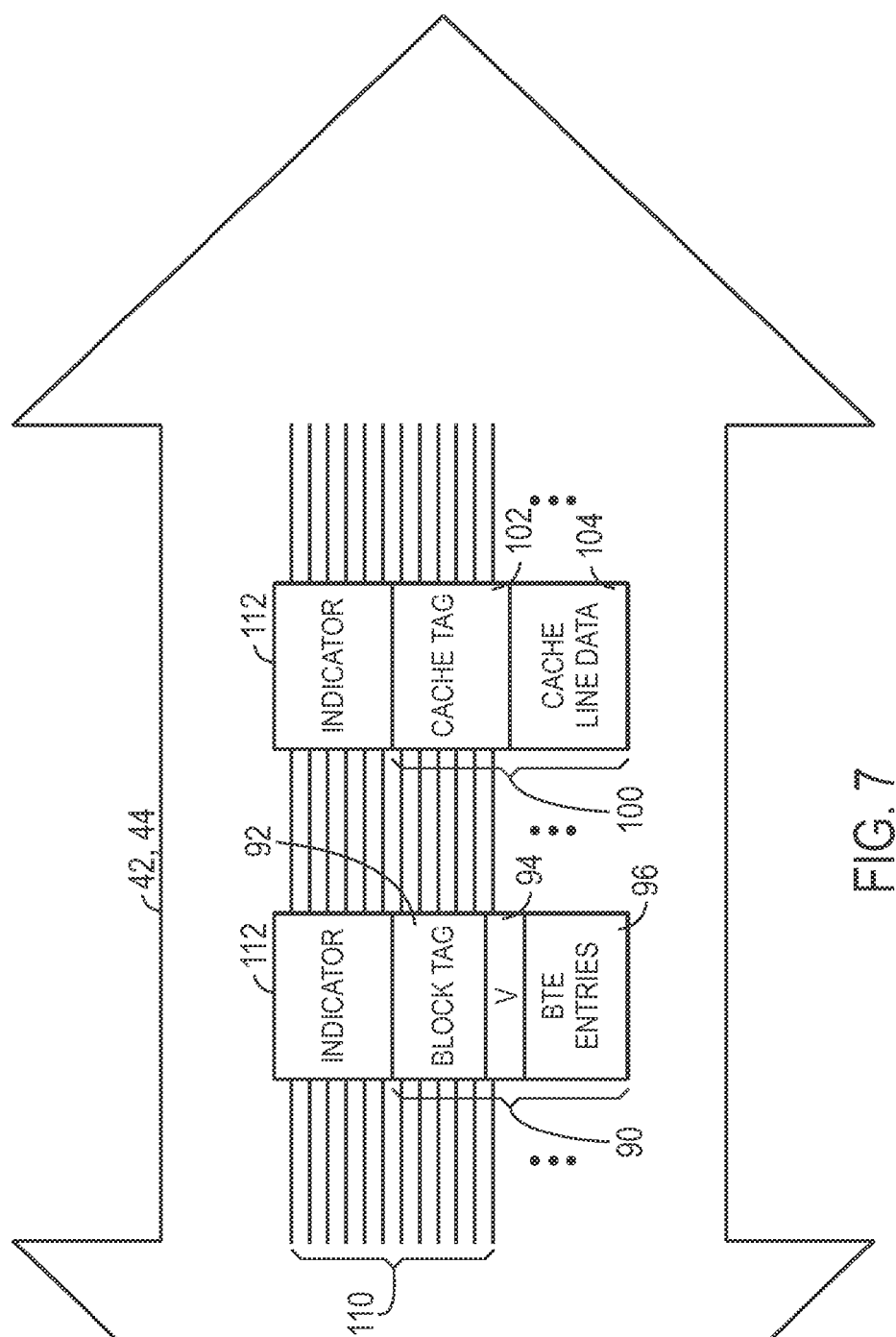
FIG. 7 is a schematic diagram of a bus for communicating snoop requests and block tracking entry (BTE) requests, in accordance with an embodiment.

The number of bits of the block tag 92, validity flag 94, and cache status entries 96 of the BTEs 90 may be selected to make use of available hardware resources of the electronic device 10. For example, as shown in FIG. 7, both block tracking entries (BTEs) 90 and cache lines 100 may be transmitted across the same data path 110 of the memory bus 42 and/or the communication bus 44. In this way, to efficiently make use of the data paths 100, the size of each BTE 90 may correspond to the size of a cache line 100. In other words, in some embodiments, the size of a BTE response may be the same size as the communication bus 44. For example, when a cache line 100 includes 128 bits of data, the BTE 90 may include 128 cache status entries 96. In addition, when a cache line 100 or a BTE 90 is transmitted across the memory bus 42 and/or communication bus 44, an indicator 112 may offer an indication of the purpose of the communication (e.g., that the communication is a BTE 90 rather than a cache line 100). In some embodiments, the size of a cache tag 102 of a cache line 100 may be similar to the size of a block 92 of a BTE 90. Likewise, in some embodiments, cache line data 104 of a cache line 100 may be the same size as the sum of the BTE entries 96 of a BTE 90.

Figure 8:
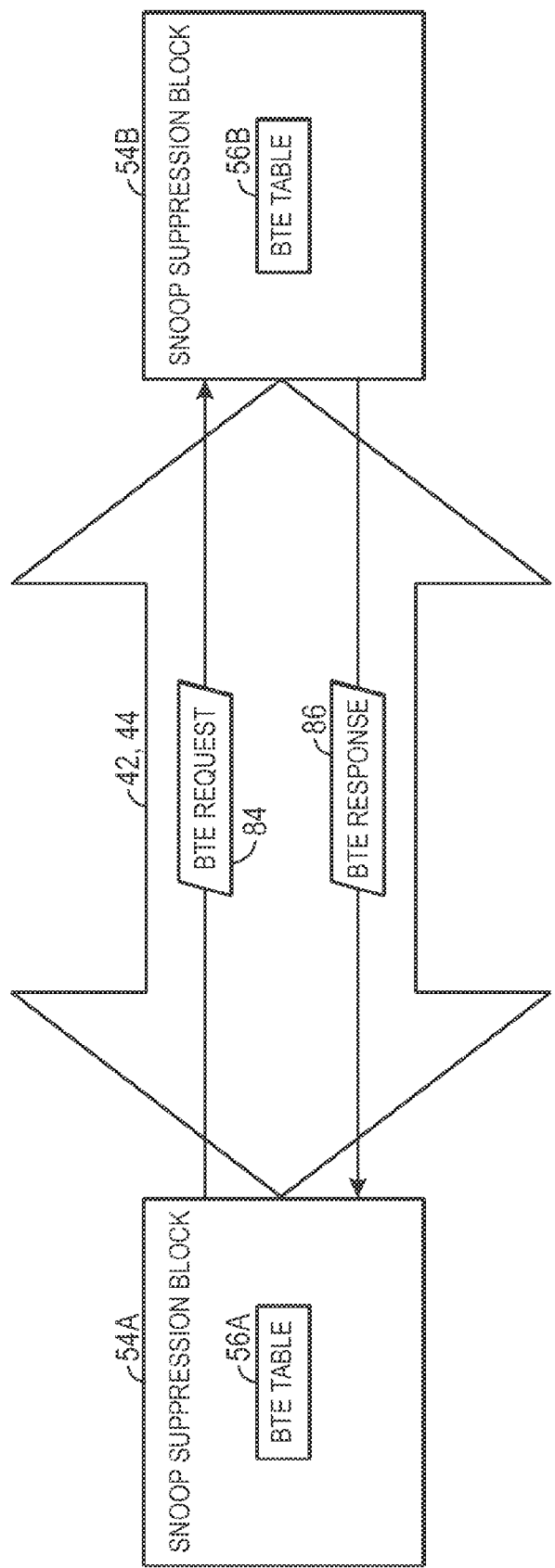
FIGS. 8 and 9 are schematic block diagrams representing communication that may take place over the memory bus of FIG. 7, in accordance with an embodiment.

Depending on the particular implementation, a snoop suppression block 54 may issue a cache line snoop request 80 or a BTE request 84, or both, upon a cache miss of a desired cache line 100. For example, as shown in FIG. 8, a first snoop suppression block 54A may issue a BTE request 84 across the memory bus 42 and/or communication bus 44, requesting another snoop suppression block 54B to provide a BTE 90 associated with a particular block of memory. By way of example, such a BTE request 84 may provide a block tag 92 and an indication of a requested granularity of cache status entries 96 of the requested BTE 90. As will be discussed below, the snoop suppression block 54B may reply with a BTE response 86 that includes a BTE 90 that conservatively provides cache line statuses (e.g., line-snoop-required or no-line-snoop-required) for groups of cache lines 100 within the requested block of memory based on the caches 48B and/or 50B. As also will be discussed further below, the snoop suppression block 54B may determine the BTE response 86 using its BTE table 56B or by performing some survey of the caches 48B and/or 52B associated with the second processor 12B. The snoop suppression block 54A then may populate its BTE table 56A using the BTE 90 received in the BTE response 86.

Figure 9:
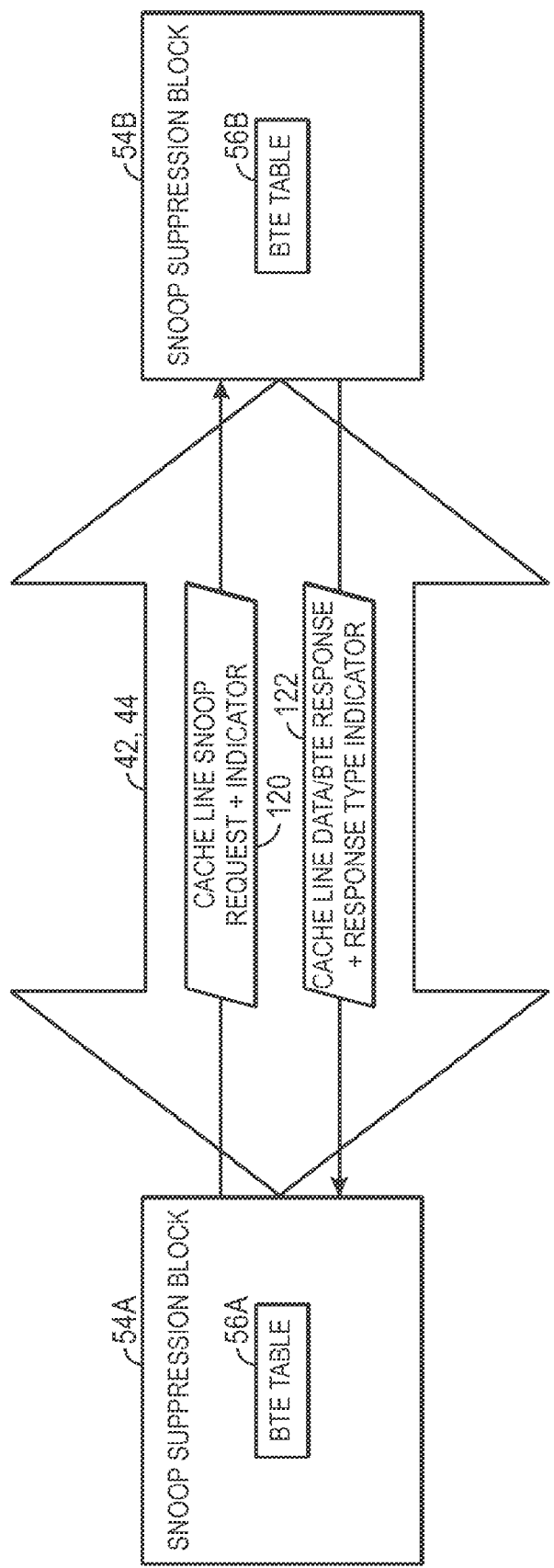

In other implementations or under other circumstances, a first snoop suppression block 54A associated with a first processor 12A may communicate over the memory bus 42 and/or communication bus 44 a cache line snoop request plus indicator 120 to a second snoop suppression block 54B associated with a second processor 12B, as shown in FIG. 9. Such an indicator 112 component of a cache line snoop request plus indicator 120 may instruct the second snoop suppression block 54B to return either a normal cache line snoop response (e.g., the cache line 100) or a BTE response 86 (e.g., which may include a BTE 90). As such, the snoop suppression block 54B may receive the cache line snoop request plus indicator 120 and prepare an appropriate response. In the example of FIG. 9, the snoop suppression block 54B may respond to the cache line snoop request plus indicator 120 with a cache line and/or BTE response plus indicator 122. Such an indicator 112 component of the cache line and/or BTE response plus indicator 122 may allow the first snoop suppression block 54A to distinguish whether the snoop suppression block 54B has returned a cache line 100 or a BTE 90.

Additionally or alternatively, the first snoop suppression block 54A may transmit a cache line snoop request 80 in lieu of the cache line snoop request plus indicator 120. By way of example, when the cache line 100 is present in the cache 48A and/or 52A of the processor 12B, or when the processor 12B has sole use of the cache line 100, the snoop suppression block 54B may respond with a cache line 100. When the cache line 100 is not in use by the processor 12B, the snoop suppression block 54B instead may return a BTE response 86 that includes a BTE 90. Such a BTE 90 may provide statuses of cache lines 100 in some block of memory to which the cache line snoop request 80 pertains.

When one of the processors 12 (e.g., 12A) seeks to operate on a cache line 100, that processor 12 (e.g., 12A) may or may not issue any snoop requests, depending on a block tracking entry (BTE) table 56 (e.g., 56A). FIGS. 10-13 generally provide examples of methods for operating the processors 12 in ways that prevent certain unnecessary snoop traffic across the memory bus 42 and/or communication bus 44. Although the following discussion refers to the first processor 12A as initiating communication with the second processor 12B, it should be appreciated that any memory-sharing device having a BTE table 56 associated therewith may employ the techniques described below.

Figure 10:
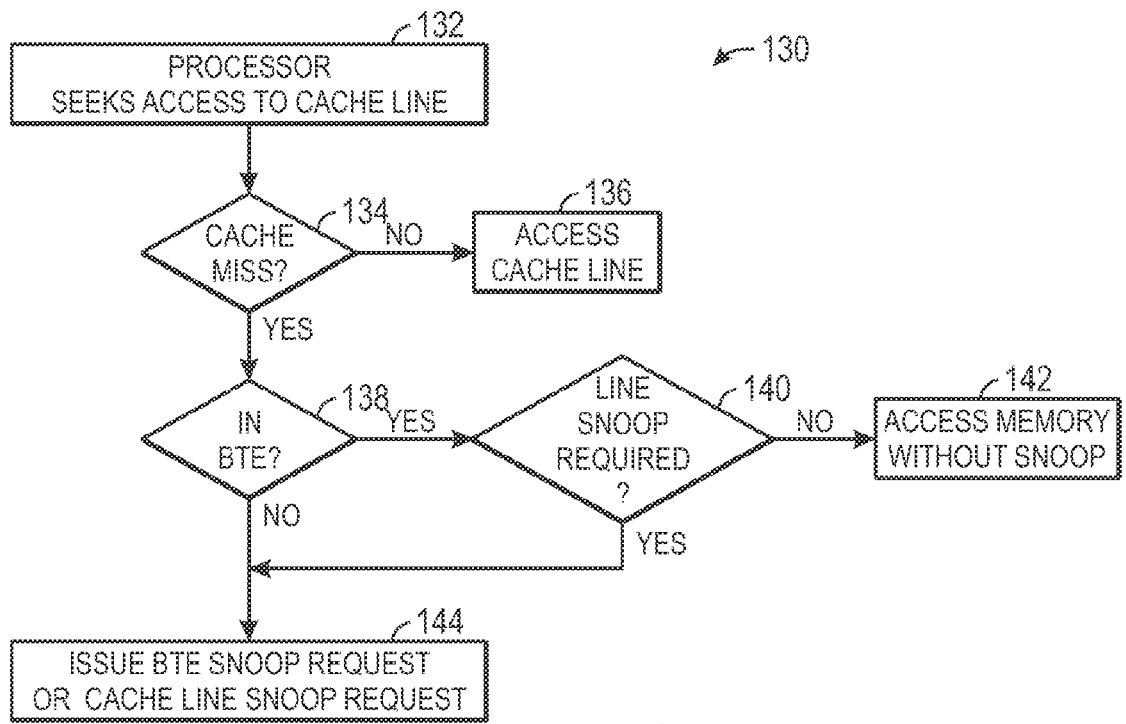
FIG. 10 is a flowchart describing an embodiment of a method for efficiently maintaining cache coherence using a table of block tracking entries (BTEs) table that track whether groups of one or more cache lines in a block of memory are possibly in use by another memory-sharing device.
Figure 11:
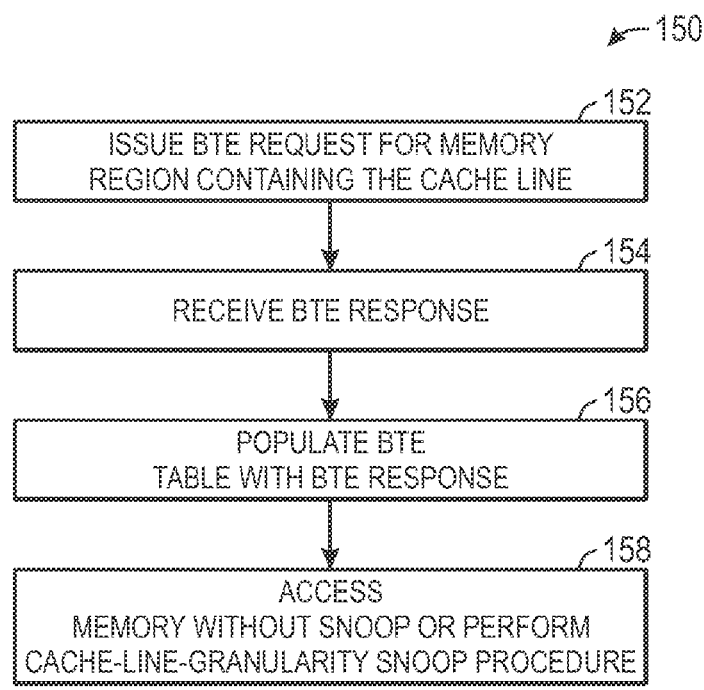
FIGS. 11-13 are flowcharts describing embodiments of methods for efficiently maintaining cache coherence between two or more memory-sharing devices in the manner of the flowchart of FIG. 10.

Turning to FIG. 10, a flowchart 130 describes how one processor 12 (e.g., 12A) may attempt to efficiently maintain cache coherence with another processor (e.g., 12B) through the use of a block tracking entry (BTE) table 56 (e.g., 56A). The flowchart 130 of FIG. 10 may begin when a processor core 46A seeks access to a desired cache line 100 (block 132). If the desired cache line 100 is present in the cache 48A and/or 52A, in an event termed a "cache hit," the cache line 100 may be accessed (block 136) according to any suitable cache coherence protocol (e.g., MESI, MOSI, MOESI, and so forth). If the desired cache line 100 is not present in the cache 48A and/or 52A, in an event termed a "cache miss," (decision block 134), the desired cache line 100 may need to be obtained from the shared memory 14 or from another processor 12 (e.g., 12B).

The manner in which the processor 12A proceeds to obtain the desired cache line 100 may depend on the status of the desired cache line 100 as indicated in the BTE table 56A. Specifically, the snoop suppression block 54A of the processor 12A may ascertain whether the status of the desired cache line 100 (or a group of cache lines 100 that includes the desired cache line 100) is listed in a cache status entry 96 of a valid BTE 90 (decision block 138). If the cache status entry 96 indicates that the desired cache line 100 (or the group of cache lines 100 that includes the desired cache line 100) is listed as no-line-snoop-required (decision block 140), the processor 12A may access the desired cache line from the shared memory 114 without issuing any snoop request transactions (block 142). In this way, the snoop suppression block 54A may effectively suppress a cache line snoop request 80 that would otherwise have been broadcast to other processors 12 (e.g., the second processor 12B) under a conventional cache coherence protocol (e.g., MESI, MOSI, MOESI, and so forth).

On the other hand, if a cache status entry 96 of a valid BTE 90 indicates the status of the desired cache line 100 (or a group of cache lines 100 that includes the desired cache line 100) as line-snoop-required or, additionally or alternatively, if no valid BTE 90 includes a cache status entry 96 indicating the desired cache line 100 (or a group of cache lines 100 that includes the desired cache line 100) as no-line-snoop-required (decision block 140), the snoop suppression block 54A may not suppress the issuance of snoop transactions. Rather, under such conditions, the snoop suppression block 54A or other snoop circuitry of the processor 12A may issue a BTE snoop request 84 and/or cache line snoop request 80 (block 144). Whether the processor 12A issues a BTE snoop request 84 or a cache line snoop request 80, or both, may depend on the particular implementation or circumstances. Various methods for carrying out such snoop transactions as indicated at block 144 are described in greater detail with reference to FIGS. 11-13.

In some embodiments, upon a cache miss of a desired cache line 100, when the desired cache line 100 is not listed as no-line-snoop-required in a cache status entry 96 in a valid BTE 90 in the BTE table 56A, the snoop suppression block 54A may issue a BTE request 84 that tracks a block of memory that includes the desired cache line 100 (block 152). As noted above, the snoop suppression block 54A may issue the BTE request 84 to ascertain a conservative indication of the line-snoop-required or no-line-snoop-required statuses of cache lines 100 of a block of memory (e.g., a memory region) that contains the desired cache line 100. Receiving this BTE request 84, other snoop suppression blocks 54, such as the snoop suppression block 54B, may prepare such a BTE 90 to return to the snoop suppression block 54A. It should be appreciated that the BTE response 86 returned by other snoop suppression blocks 54 belonging to other processors 12, such as the snoop suppression block 54B of the other processor 12B, may conservatively indicate whether the cache lines 100 of the block of memory tracked by the BTE 90 are possibly in use by that processor 12. In other words, the BTE 90 contained in a BTE response 86 received by the first snoop suppression block 54A may always accurately indicate when a cache line 100 is line-snoop-required, but may not necessarily always accurately indicate when a cache line 100 is no-line-snoop-required. In this way, a BTE 90 received in the BTE response 86 may result in suppressed snoop requests only when doing so will not disrupt cache coherence, even though some additional, unnecessary snoop requests may result. Various manners in which the second snoop suppression block 54B may prepare a BTE 90 and reply with a BTE response 86 are described in greater detail below.

Having received one or more BTEs 90 in one or more BTE responses 86, the snoop suppression block 54A may populate its associated BTE table 56A using these BTEs 90 (block 156). Thereafter, the first processor 12A may proceed to access the desired cache line 100 in the manner described above with reference to FIG. 11 based on the newly populated BTE table 56A (block 158). That is, if the newly received BTE 90 indicates that the desired cache line is no-line-snoop-required, the snoop suppression block 54A may access the desired cache line in the shared memory 14 without issuing a snoop request. If the desired cache line is indicated as line-snoop-required in the newly received BTE 90, the snoop suppression block 54A may issue a cache line snoop request 80 to ensure cache coherence is maintained.

Figure 12:
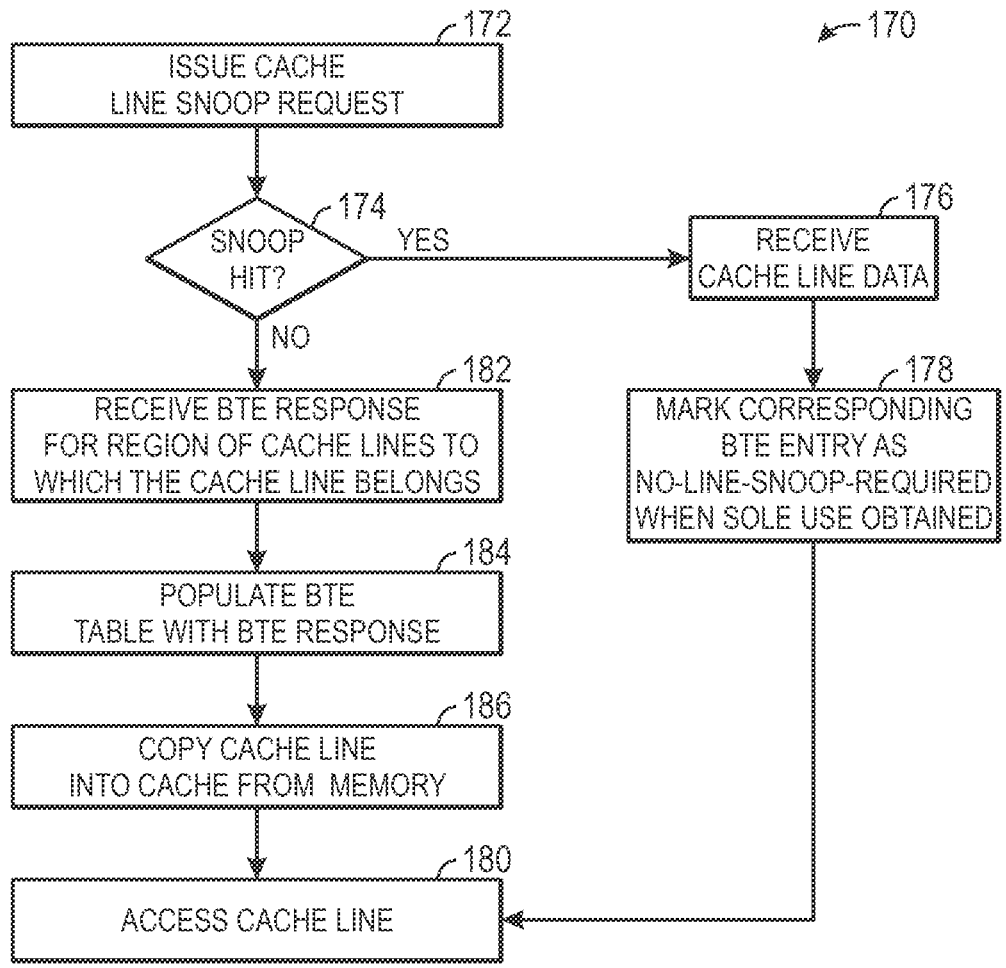

In some embodiments, as represented by a flowchart 170 of FIG. 12, the first processor 12A may issue a cache line snoop request 80 (block 172) after the occurrence of a cache miss in which a valid BTE 90 does not indicate the desired cache line as no-line-snoop-required. If the cache line snoop request 80 results in a "snoop hit" (decision block 174), meaning that the desired cache line is in use by or found in another cache 48 or 50 of another processor 12 (e.g., caches 48B and/or 52B of the processor 12B), the first processor 12A may receive at least the cache line data 104 from the second processor 12B (block 176).

Further, if, according to the cache coherence protocol (e.g., MESI, MOSI, MOESI, and so forth) in use in the electronic device 10, issuing the cache line snoop request 80 results in sole use of the desired cache line 100 (e.g., ownership and/or exclusivity) (and/or a group of cache lines 100 tracked by a cache status entry 96 that includes the desired cache line 100) to the first processor 12A, the first processor 12A may mark a cache status entry 96 that includes the desired cache line as no-line-snoop-required (block 178). Additionally or alternatively, the first processor 12A may mark the cache status entry 96 as no-line-snoop-required if issuing the cache line snoop request 80 resulted in the desired cache line 100 (and/or a group of cache lines 100 tracked by a cache status entry 96 that includes the desired cache line 100) achieving any other status that would cause the desired cache line 100 (and/or the cache lines of the group of cache lines 100 tracked by the cache status entry 96 that includes the desired cache line 100) to be inaccessible to the second processor 12B without the second processor 12B issuing a snoop response of some sort. If no such BTE 90 is present in the BTE table 56A of the snoop suppression block 54A, such a BTE 90 may be created and added to the BTE table 56A, in which all cache status entries 96 of that BTE 90 may be marked as line-snoop-required, with possible exception of the cache status entry 96 that corresponds to the desired cache line 100 over which the first processor 12A now has sole use. If issuing the cache line snoop request 80 results in sole use over a particular block of memory to which the desired cache line 100 belongs, all cache status entries 96 of the BTE 90 may be marked as no-line-snoop-required. Regardless of whether the first processor 12A receives sole use of the desired cache line 100, after receiving the cache line data 104 of the desired cache line 100 (block 176) the first processor 12A then may access the cache line 100 (block 180).

When the issuance of the cache line snoop request 80 in block 172 by the first processor 12A does not result in a snoop hit at other processors 12 (e.g., the second processor 12B) (decision block 174), the other processors 12 may determine and return a BTE response 86 that includes a BTE 90, which may be received by the processor 12A (block 182). The first processor 12A may use the BTEs 90 contained in the BTE responses 86 to populate its BTE table 56A (block 184). For example, if the first processor 12A receives two BTE responses 86 containing two BTEs 90, the first processor 12A may populate its BTE table 56A using both BTEs responses 86 such that all cache status entries 96 that indicate a cache line 100 as line-snoop-required are included in the BTE table 56A. Because the issuance of the cache line snoop request 80 at block 172 did not result in a snoop hit at any other processors 12 (decision block 174), the first processor 12A next may copy the cache line 100 from the shared memory 14 into its caches 48A and/or 52A (block 186). The desired cache line 100 then may be accessed from the cache 48A and/or 52A (block 180).

Figure 13:
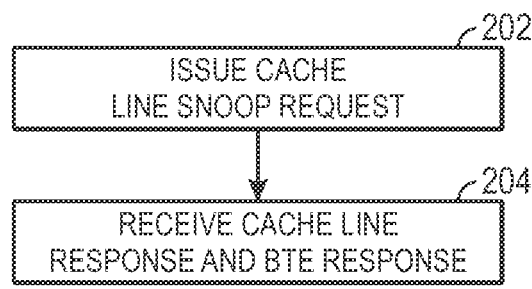

Additionally or alternatively, as shown by a flowchart 200 of FIG. 13, when the first processor 12A issues a cache line snoop request 80 (block 202), the first processor 12A may receive both a cache line snoop response 82 and a BTE response 86 in reply (block 204). In some embodiments, the first processor 12A may receive both the cache line snoop response 82 and the BTE response 86 whether or not a snoop hit results at another processor 12 (e.g., the second processor 12B). As in the flowchart 12 above, the first processor 12A then may use the cache line response 82 and/or the BTE response 86 to populate its BTE table 56A and to gain access to the desired cache line 100.

Figure 14:
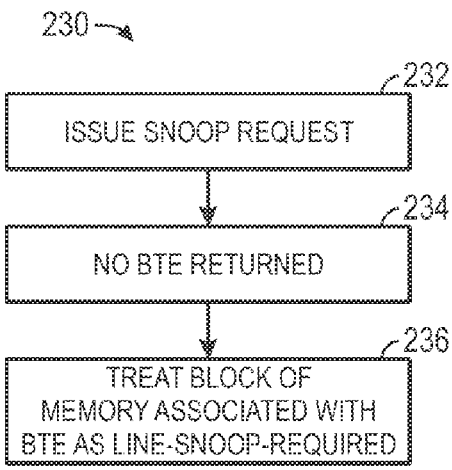
FIG. 14 is a flowchart describing an embodiment of a method for preemptively populating a block tracking entry (BTE) table to efficiently maintain cache coherence.
Figure 15:
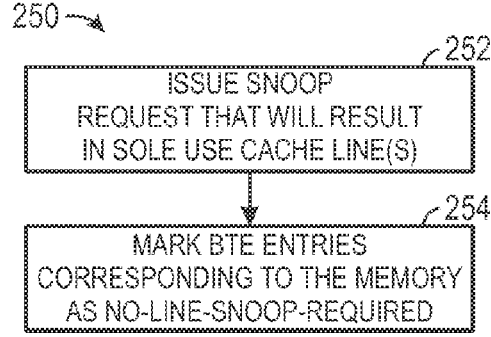
FIGS. 15-17 are flowcharts describing embodiments of methods for updating entries in a block tracking entry (BTE) table.
Figure 16:
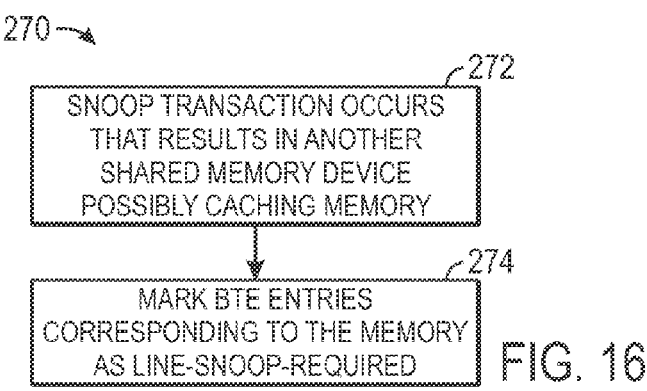
Figure 17:
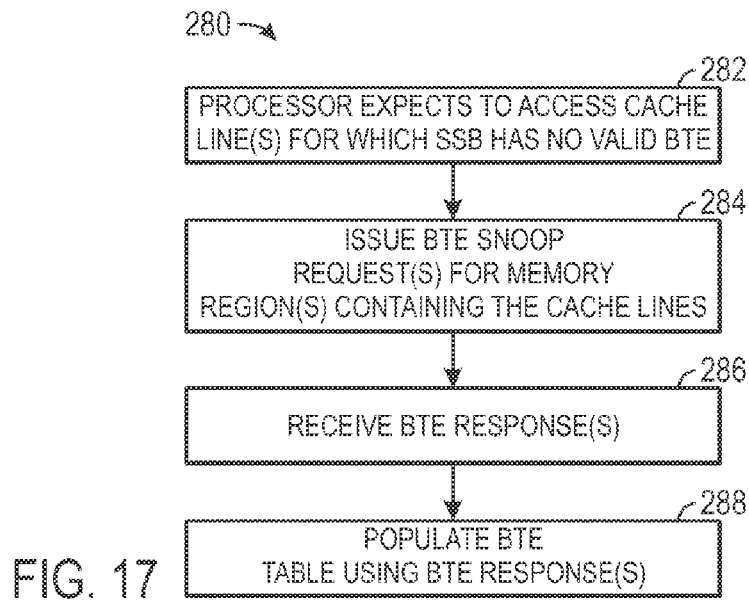

Certain miscellaneous rules for maintaining cache coherence according to various embodiments are described in FIGS. 14-16. For example, a flowchart 230 of FIG. 14 describes one manner in which the first snoop suppression block 54A may treat a failure by another processor 12 (e.g., the second processor 12B) to respond to a snoop request associated with a desired cache line 100 by the first processor 12A. The flowchart 230 may begin when the first processor 12A issues some form of snoop request (e.g., cache line snoop request 80 and/or BTE request 84) associated a desired cache line 100 (block 232). If no BTE responses 86 are returned in response (block 234) within some threshold amount of time, it may be assumed that the second processor 12B could be using any of the cache lines 100 contained in a block of memory to which the desired cache line 100 may belong. As such, the first processor 12A may treat that all cache lines 100 in that block of memory to be line-snoop-required in a corresponding BTE 90 (block 236).

By way of example, in the event that the first processor 12A issues a cache line snoop request 80 resulting in a snoop hit at the second processor 12B, the second processor 12B may return only the desired cache line 100 (and evicting or invalidating that cache line 100 from its own cache 48B and/or 52B according to any suitable cache coherence protocol (e.g., MESI, MOSI, MOESI, and so forth)). Although the second processor 12B may not have returned a BTE response 86, the first processor 12A may create and/or update an associated BTE 90. All of the cache status entries 96 of the BTE 90 may be set as line-snoop-required, insuring that the snoop suppression block 54A does not inadvertently suppress a snoop request for a cache line 100 that might be in use by the second processor 12B.

According to certain cache coherence protocols, some snoop transactions that could be issued by the first processor 12A may result in sole use of a desired cache line 100 (e.g., exclusivity and/or ownership). For example, as shown in FIG. 15, when such a snoop transaction occurs (block 252), the first processor 12A may mark any cache status entries 96 that are now in sole use by the first processor 12A as no-line-snoop-required (block 254). For example, if the snoop transaction of block 252 resulted in the sole use of a desired cache line 100, a cache status entry 96 corresponding to the desired cache line may be marked as no-line-snoop-required. If the snoop transaction of block 252 resulted in the sole use of a block of memory, all cache status entries 96 of a BTE 90 corresponding to the block of memory may be marked as no-line-snoop-required. Further, as shown by a flowchart 270 of FIG. 16, the first processor 12A sometimes may be subject to a snoop transaction that results in another memory-sharing device, e.g., the second processor 12B) possibly caching one or more cache lines 100 (block 272). When such a snoop transaction occurs, the first processor 12A may mark corresponding cache status entries 96 of a BTE 90 as line-snoop-required (block 274).

As noted above, the processor 12A may populate its associated BTE table 56A based on snoop requests that occur after a cache miss. In some embodiments, the first processor 12A may, additionally or alternatively, populate its BTE table 56A by prospectively issuing BTE requests 84. For example, as shown by a flowchart 280 of FIG. 17, the processor 12A may expect to access in the future certain cache lines 100 for which the BTE table 56A may have no valid BTE 90 (or for which the BTE table 56A may have a valid BTE 90 that has not been updated within some period of time) (block 282). By way of example, the first processor 12A may expect to access such cache lines 100 when a task running on the processor 12A indicates that it expects to operate on such cache lines 100 in the future. At a convenient time (e.g., during spare cycles) the first processor 12A may issue BTE snoop request(s) 84 for the regions of memory at contain the cache lines 100 expected to be accessed (block 284). The first processor 12A may receive one or more BTE response(s) 86 (block 286) in response to the BTE request(s) 84 of block 284, which may be used to populate its BTE table 56A (block 288). Thereafter, when the cache lines 100 are eventually accessed, the snoop suppression block 54A may use the newly populated BTE table 56A to avoid unnecessary snoop requests in the manner discussed above.

The above discussion associated with FIGS. 10-17 generally related to manners in which an issuing processor (e.g., the first processor 12A) may employ its BTE table 56A to efficiently maintain cache coherence. Below, a discussion relating to manners in which the receiving memory-sharing device (e.g., the second processor 12B) may respond will follow. In particular, FIGS. 18-21 generally relate to different manners in which a memory-sharing device may respond to a cache line snoop request 80 and/or a BTE request 84. Although, in the discussion of FIGS. 18-21, the receiving memory-sharing device is represented by the second processor 12B in keeping with the examples above, it should be appreciated that, in practice, either the first processor 12A or the second processor 12B (or any other memory-sharing devices according to present embodiments) may fill such a role. Before continuing further, it should also be noted that the examples of FIGS. 18-21 are not necessarily mutually exclusive to one another.

Figure 18:
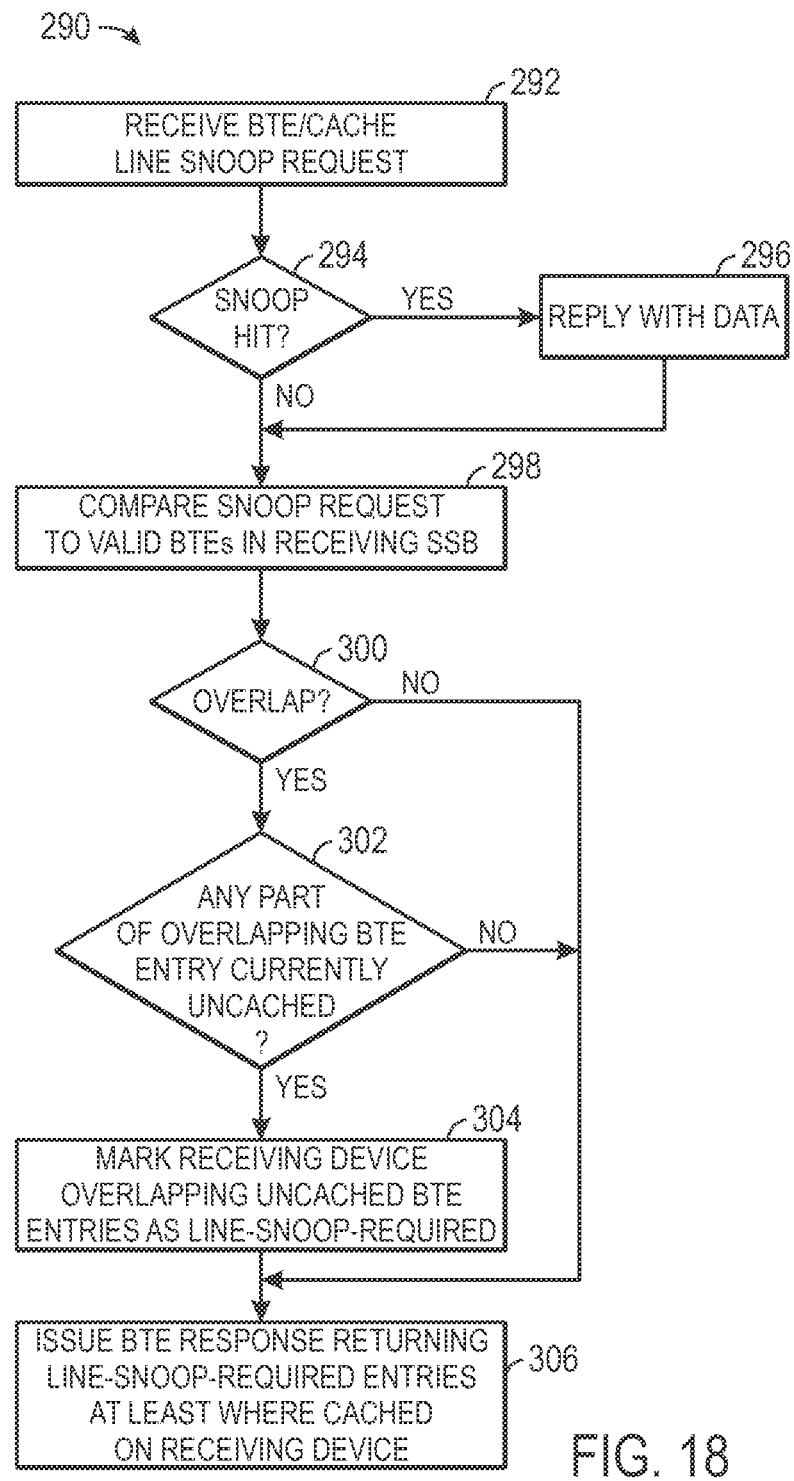
FIGS. 18-21 are flowcharts describing embodiments of methods for responding to cache line or block tracking entry (BTE) snoop requests.

With the foregoing in mind, FIG. 18 illustrates a flowchart 290 that provides a first method of responding to a cache line snoop request 80 and/or BTE request 84. The flowchart 290 may begin when the second processor 12B receives a cache line snoop request 80 and/or a BTE request 84 from the first processor 12A, as may generally occur as a result of the embodiments of methods described above with reference to FIGS. 10-17 (block 292). If the cache line 100 requested in the snoop request of block 292 is located in the cache 48B and/or 52B of the second processor 12B (decision block 294), meaning that a "snoop hit" has occurred, the second processor 12B may reply to the snoop request of block 292 by providing the cache line data 104 of the cache line 100 in a cache line snoop response 82 (block 296). Additionally or alternatively, the second processor 12B may return a BTE response 86 that contains a BTE 90 associated with the block of memory to which the cache line 100 pertains, as discussed above with reference to the flowchart 200 of FIG. 13 above.

Following block 296, or if the snoop request of block 292 does not result in a snoop hit (decision block 294), the second processor 12B may compare the snoop request of block 292 to valid BTEs 90 in its BTE table 56B (block 298). To the extent there is an overlap between the valid BTEs 90 and the cache line snoop request 80 and/or BTE request 84 received at block 292 (decision block 300), and any part of an overlapping cache status entry 90 is currently uncached (decision block 302), such cache status entries 96 may be marked as line-snoop-required (block 304). That is, uncached cache lines that overlap with the snoop request received at block 292 may be understood as potentially now in use (or soon-to-be in use) by the first processor 12A. As such, marking these cache status entries 96 as line-snoop-required, as indicated by block 304, may insure that the second processor 12B communicates a snoop request of some sort to the first processor 12A before accessing such memory.

In some embodiments, the second processor 12B may issue a cache line snoop response 82 and/or a BTE response 86 after block 304. For example, in the embodiment of FIG. 21, following block 304, or if no cache lines 100 of the caches 48B and/or 52B overlap with the snoop request of block 292 (decision block 300) and/or if no part of such overlapping cache lines 100 are currently uncached (decision block 302), the second processor 12B may prepare and issue a BTE response 86 that includes a BTE 90 (block 306). This BTE response 86 may include a BTE 90 that includes cache status entries 96 indicating cache lines 100 as line-snoop-required at least where such cache lines 100 are stored in its cache 48B and/or 52B.

That is, the second processor 12B may issue a BTE response 86 that includes a BTE 90 that conservatively returns more cache status entries 96 flagged as line-snoop-required than may actually be cached in the cache 48B and/or 52B of the second processor 12B. Doing so will not violate the essential character of the presently described cache block coherence protocol. By way of example, if the processor 12B includes a cache 48B and/or 52B with 4 MB of 64-byte collections of cache lines, such caches 48B and/or 52B may include a total of 65,536 cache lines 100. It may be difficult to exhaustively search through the caches 48B and/or 52B to determine whether or not cache lines 100 the subject of a BTE 90 are cached. Instead, the processor 12B may prepare the BTE response 86 using some conservative, lower-granularity indication of cache-line status or conservative probabilistic data. For example, the processor 12B may maintain a counted Bloom filter or any other suitable filter or filter-hierarchy that includes similar properties of the cache lines in the caches 48B and/or 52B of the second processor 12B. Although such an implementation might return false positives (i.e., cache status entries 96 indicating cache lines 100 as line-snoop-required when these cache lines 100 may not actually be present in the cache 48B and/or 52B), but must not return any false negatives (i.e., cache status entries 96 indicating cache lines 100 as no-line-snoop-required that are actually present in the cache 48B and/or 52B).

Figure 19:
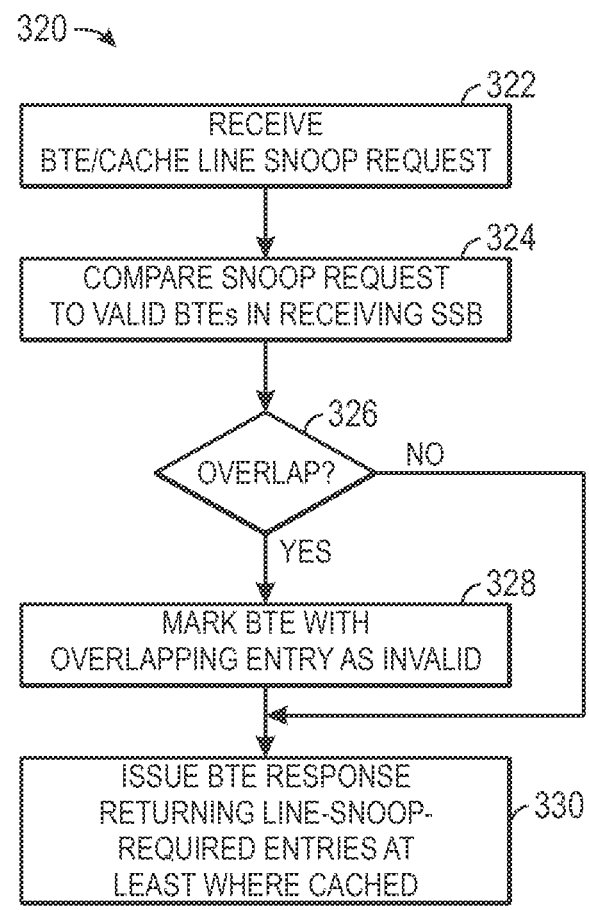

A flowchart 320 of FIG. 19 represents another manner of updating the BTE table 56B in response to receiving a snoop request (e.g., a cache line snoop request 80 and/or a BTE request 84) from the first processor 12A. The flowchart 320 of FIG. 19 may begin when the second processor 12B receives a cache line snoop request 80 and/or BTE request 84 from the first processor 12A (block 322). The second processor 12B may compare the snoop request of block 322 to the valid BTEs 90 contained in the BTE table 56B of the second processor 12B (block 324). To the extent that any valid BTEs 90 track cache lines 100 that overlap (decision block 326), the second processor 12B may mark such cache status entries 90 as invalid (block 328) (e.g., by switching the validity flag 94 to indicate the BTE 90 is invalid). After the actions of block 328, or if there is no overlap between the valid BTE table 56B and the snoop request of block 322 (decision block 326), the second processor 12B may prepare and issue a snoop response, which may include a cache line snoop response 82 and/or a BTE response 86 (block 330). The second processor 12B may prepare and issue the BTE response 86 to include a BTE 90 that conservatively indicates cache lines 100 as line-snoop-required at least where such cache lines 100 are cached in the caches 48B and/or 52B, using any suitable technique. For example, the second processor 12B may prepare and issue the BTE response 86 according to the techniques described above with reference to block 306 of FIG. 18.

Figure 20:
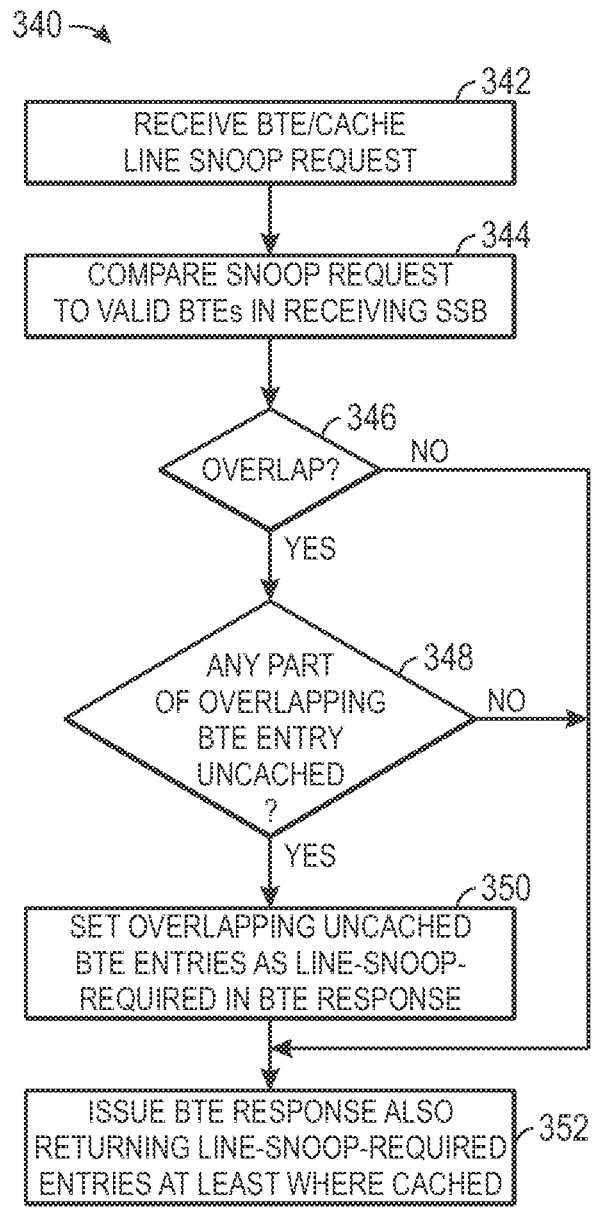

In some embodiments, as shown by a flowchart 340 of FIG. 20, the second processor 12B may not simply mark entire BTEs 90 that overlap with a received snoop request as invalid, as generally described above with reference to FIG. 19. Rather, the processor 12B may prepare the BTE response 86 to indicate certain individual cache status entries 96 as line-snoop-required when such cache status entries 96 correspond to uncached cache lines that overlap with a snoop request. In particular, the flowchart 340 may begin when the second processor 12B receives a cache line snoop request 80 and/or BTE request 84 (block 342) from another memory-sharing device (e.g., the first processor 12A).

The second processor 12B may compare the valid BTEs 90 of its BTE table 56B to the snoop request of block 342 (block 344). Next, the second processor 12B may determine whether there is overlap between the snoop request of block 342 and the valid BTEs 90 of the BTE table 56B (decision block 346). If any parts of such overlapping valid BTEs 90 include cache status entries 96 that track a cache line 100 not cached by the second processor 12B (e.g., such cache lines 100 are not present in the caches 48B and/or 52B) (decision block 348), the second processor 12B may indicate these cache status entries 96 as line-snoop-required in a BTE response 86. Such a BTE response 86 also may indicate as line-snoop-required any cache status entries 96 that track cache lines 100 cached by the processor 12B in the caches 48B and/or 52B (block 352), as may be determined in the manner of block 306 of FIG. 18. It should be noted that by indicating as line-snoop-required in the BTE response 86 those uncached cache lines 100 tracked by the BTE table 56B, the processor 12B may effectively require the first processor 12A to engage in some form of snoop request before gaining access to any of these cache lines 100.

It should also be noted that preparing and issuing the BTE response 86 at block 352 does not preclude the issuance of a cache line snoop response 82. Moreover, in some embodiments, the second processor 12B may issue a cache line snoop response 82 in the event of a snoop hit, returning the desired cache line 100. Under such conditions, the second processor 12B may or may not prepare and issue a BTE response 86 as shown in FIG. 20.

Figure 21:
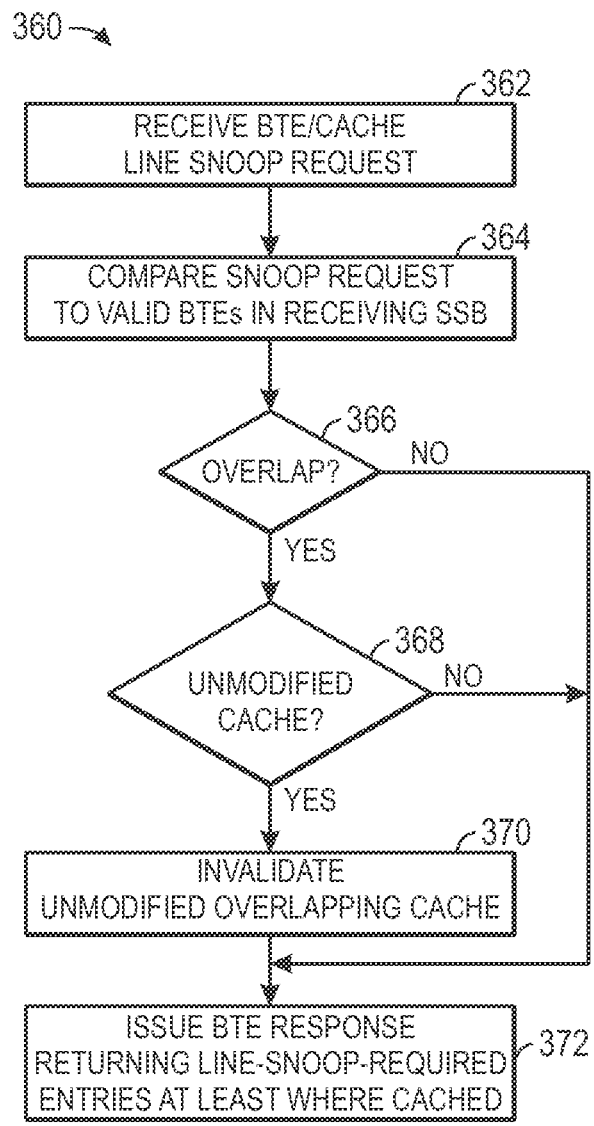

In some embodiments, the second processor 12B may react to a snoop response from the first processor 12A by invalidating unmodified cache lines stored in its cache 48B and/or 52B that overlap with the snoop request from the first processor 12A. A flowchart 360 of FIG. 21 represents an embodiment of such a method. The flowchart 360 may begin when the second processor 12B receives a snoop request (e.g., a cache line snoop request 80 and/or BTE request 84) (block 362). The snoop suppression block 54B of the second processor 12B may compare the valid BTEs 90 contained in the BTE table 56B of the snoop suppression block 54B to the snoop request received in block 362.

To the extent that such valid BTEs 90 include cache status entries 96 tracking memory that overlaps with the memory that is the subject of the snoop request of block 362 (decision block 366) and such memory is included in cache lines 100 that are unmodified in the caches 48B and/or 52B of the second processor 12B (decision block 368), the processor 12B may invalidate such unmodified overlapping cache lines 100 according to the cache coherence protocol (e.g., MESI, MOSI, MOESI, and so forth) is in use (block 370). Otherwise, or following the action of block 370, the processor 12B may issue a snoop response (e.g., a cache line snoop response 82 and/or a BTE response 86). For example, as shown at block 372 in FIG. 21, the second processor 12B may prepare and issue a BTE response 86 that conservatively indicates cache lines 100 to be line-snoop-required at least where such cache lines 100 are cached in the caches 48B and 52B, except for those cache lines 100 invalidated at block 370. As such, the BTE response prepared and issued at block 372 may be prepared and issued in substantially the same manner as in block 306 of FIG. 18, with a few possible exceptions. For example, at certain times, the cache status entries 96 corresponding to the cache lines 100 invalidated at block 370 may not necessarily be indicated as line-snoop-required.

In certain embodiments, one or more memory-sharing device of the electronic device 10, such as a relatively low-bandwidth processor 12 (e.g., the first processor 12A) may support responding to BTE snoop requests 84 or cache line snoop requests 80 by providing BTE responses 86 while not issuing BTE requests 84 and/or populating a BTE table 56 (e.g., a BTE table 56A). That is, because low-bandwidth memory-sharing devices may not need to access cache lines from the shared memory 14 very often, such low-bandwidth devices may, in some embodiments, always simply issue cache line snoop requests 80 upon cache misses. That is, in these certain embodiments, the low-bandwidth memory-sharing devices may not even include a snoop suppression block 54 or a BTE table 56. Nevertheless, such low-bandwidth memory-sharing devices may yet still respond to snoop requests by issuing a BTE request 86 to enable other memory-sharing devices (e.g., high-bandwidth memory-sharing devices such as the second processor 12B) to populate a BTE table 56 and maintain a snoop suppression block 54 (e.g., the BTE table 56B of the snoop suppression block 54B of the second processor 12B).

Figure 22:
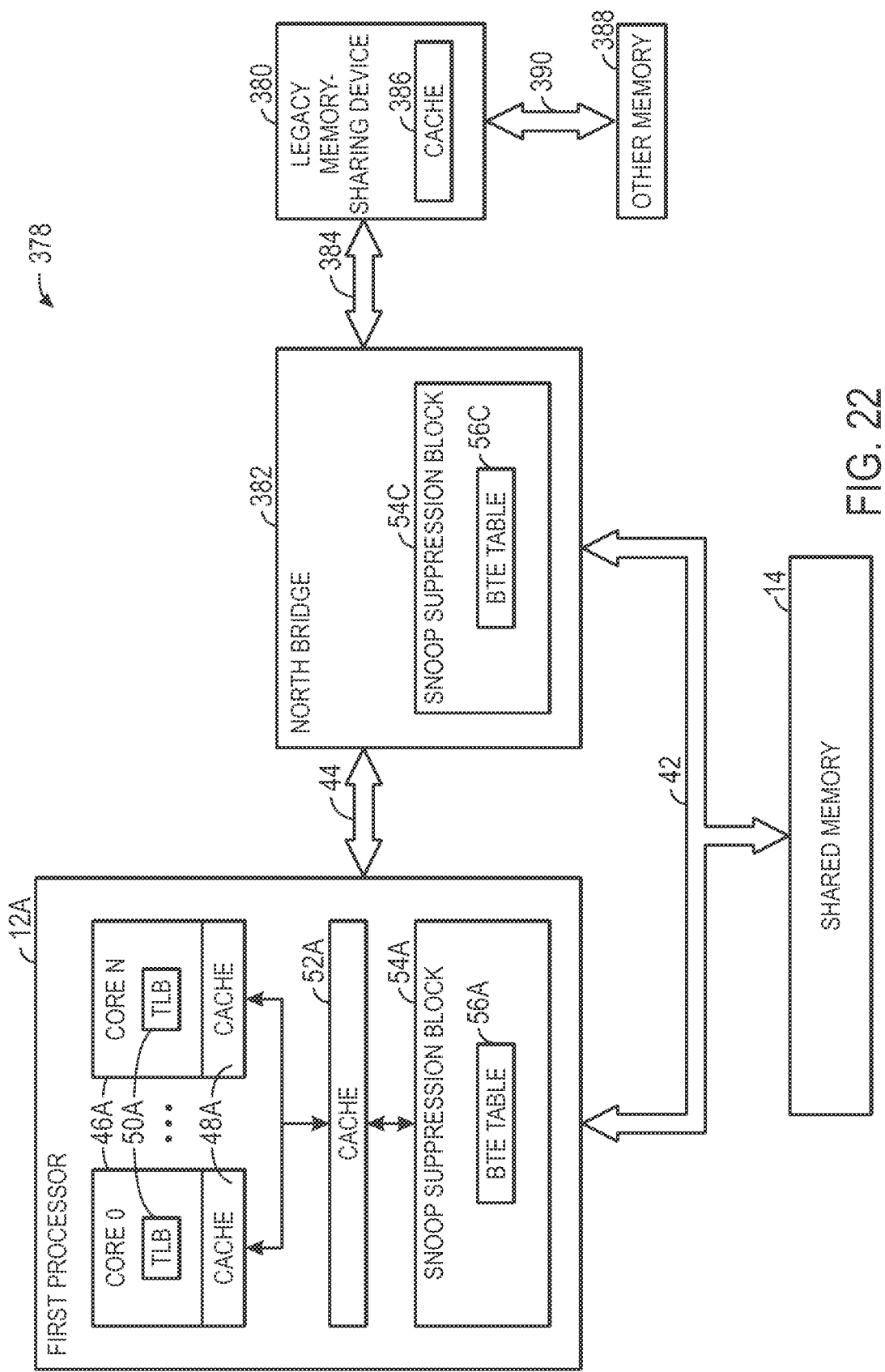
FIG. 22 is a schematic block diagram of two memory-sharing device, one of which may be a legacy memory-sharing device without a table of block tracking entries (BTEs), capable of efficiently maintaining cache coherence, in accordance with an embodiment.

In some other embodiments, such as the embodiment of a legacy device integration configuration 378 of FIG. 22, a memory-sharing device (e.g., a processor 12) with a BTE table 56 may maintain cache coherence with a legacy memory-sharing device 380. Though the legacy memory-sharing device 380 may lack a BTE table 56 and/or the ability to respond intelligibly to BTE requests 84, efficient cache coherence still may be maintained. Specifically, in the legacy device integration configuration 378, a cache block coherence interface 382 (illustrated in FIG. 22 as a North Bridge) may be capable of responding to BTE requests 84 from the first processor 12A. Although this cache block coherence interface 382 is shown as the North Bridge of a system board, the cache block coherence interface 382 may appear in any suitable location, as long as the cache block coherence interface 382 remains communicably interposed between the processor 12A and the legacy memory-sharing device 380 for cache coherence purposes.

By way of example, the first processor 12A may issue cache line snoop requests 80 and/or BTE requests 84 to the cache block coherence interface 382 by way of a memory bus 42 and/or a communication bus 44. The cache block coherence interface 382 then may interpret these snoop requests and respond appropriately based at least partly using a snoop suppression block 54C that includes a BTE table 56C. The cache block coherence interface 382 may communicate with the legacy memory-sharing device 380 through a communication bus 384, which may be, for example, a PCIe communication bus. The legacy memory-sharing device 380 may include its own cache 386, which may store cache lines 100 from the shared memory 14 and/or from other memory 388. The legacy memory-sharing device 380 may access such other memory 388 by way of a memory bus 390.

The cache block coherence interface 382 may receive and respond to cache line snoop requests 80 and/or BTE requests 84 from the first processor 12A, and/or may suppress certain unnecessary snoop requests from the legacy memory-sharing device 380. For example, when the first processor 12A issues a BTE response 84 to the cache block coherence interface 382, the cache block coherence interface 382 may respond by preparing and issuing a BTE response 86. The BTE response 86 may include a BTE 90 that conservatively lists the status of cache lines 100 as line-snoop-required when such cache lines 100 are present in the cache 386 and/or the legacy memory-sharing device has exclusivity and/or ownership of such cache lines 100. Likewise, when the legacy memory-sharing device 380 requests a desired cache line 100 listed as no-line-snoop-required in a valid BTE 90 of the BTE table 56C, the cache block coherence interface 382 may suppress this snoop request. Instead, the cache block coherence interface 382 may access the desired cache line 100 in the shared memory 14 without forwarding or issuing a snoop request. Similarly, the cache block coherence interface 382 may issue BTE requests 84 and populate its BTE table 56C in the manner discussed above.

Figure 23:
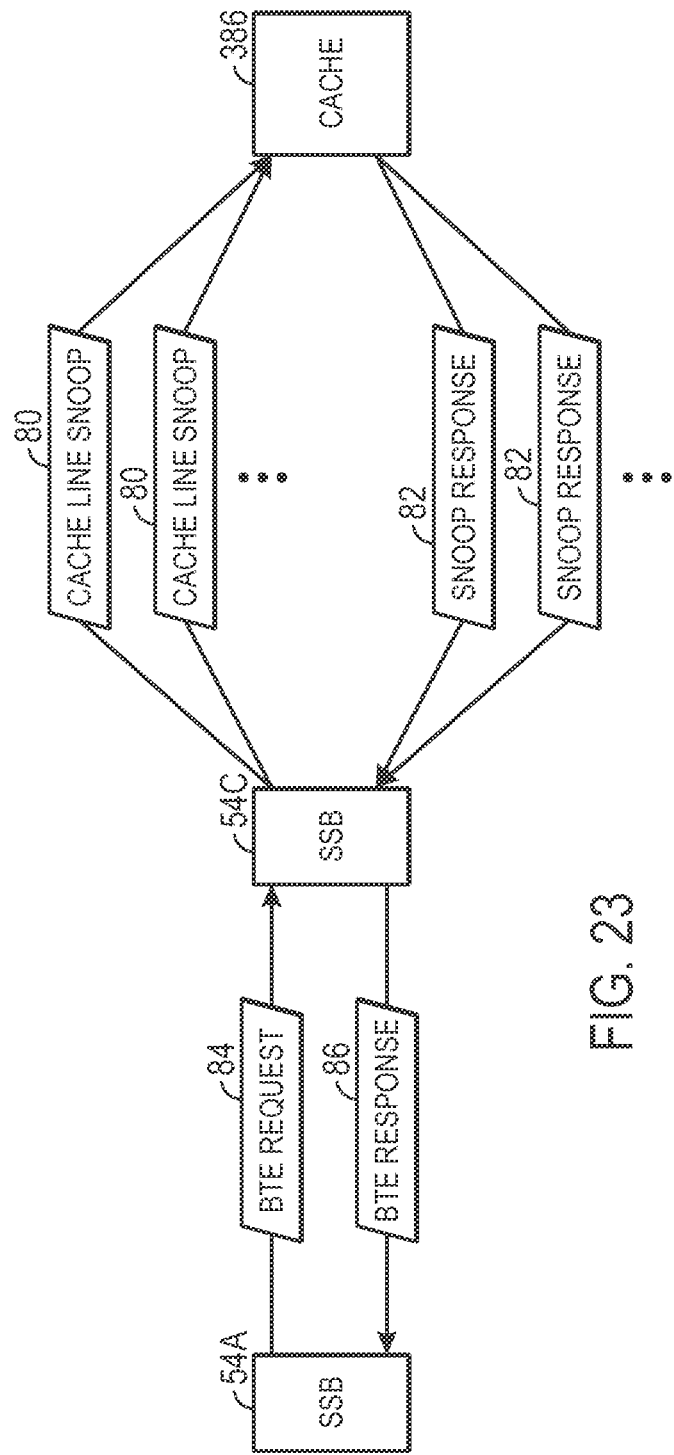
FIG. 23 is a flow diagram representing communication that may take place to maintain cache coherence in the system of FIG. 22, in accordance with an embodiment.

To reply to a BTE request 84 and/or a cache line snoop request 80 from the processor 12A to the legacy memory-sharing device 380, the cache block coherence interface 382 may generate a BTE response 86 using any suitable technique. One such embodiment appears in FIG. 23. In an example shown in FIG. 23, the snoop suppression block 54A of the processor 12A issues a BTE request 84 to the snoop suppression block 54C of the cache block coherence interface 382. The snoop suppression block 54C may communicate with the legacy memory-sharing device 380 in a manner intelligible to the legacy memory-sharing device 380. For example, the cache block coherence interface 382 may issue some number of cache line snoop requests 80 to the cache 386 of the legacy memory-sharing device 380. The number of cache line snoop requests 80 may depend on present time constraints for responding to the BTE request 84 and/or the how conservative the BTE request 86 indicates cache lines as no-line-snoop-required will be suitable. For example, the snoop suppression block 54C may issue one or only a few cache line snoop requests 80 when time is pressing and/or most cache status entries 96 may be acceptably listed as no-line-snoop-required in a BTE 90 returned in a BTE response 86. Likewise, the snoop suppression block 54C may issue one or only a few cache line snoop requests 80 when time is pressing and/or most cache status entries 96 may be acceptably listed as no-line-snoop-required in a BTE 90 returned in a BTE response 86.

The legacy memory-sharing device 380 may receive the cache line snoop requests 80 and respond with cache line snoop responses 82. The snoop responses 82 returned by the cache 386 to the snoop suppression block 54C of the cache block coherence interface 382 may be used to prepare a BTE response 86. Specifically, depending on the results of the snoop responses 82 from the cache 386 to the snoop suppression block 54C, the BTE response 86 may indicate cache lines 100 known not to be stored in the cache 386 as no-line-snoop-required in the requested block of memory requested in the BTE request 84.

Regardless of configuration, the electronic device 10 may employ BTEs 90 that track static or dynamic sizes of memory (e.g., numbers of cache lines 100). That is, in some embodiments, a BTE 90 may always track a block of memory of a single size. Additionally or alternatively, BTEs 90 may track non-homogeneous sizes of blocks of memory, or may track dynamic sizes of block of memory that can be adjusted as conditions in the electronic device 10 change.

For example, a BTE 90 may track particular blocks of memory using cache status entries 96 that respectively track coarser-grained or finer-grained groups of cache lines 100 depending on the memory-sharing device. By way of example, the processor 12A may employ BTEs 90 with cache status entries 96 that track relatively fine-grained groups of cache lines 100 (e.g., each cache status entry 96 may correspond to one cache line). Meanwhile, because the second processor 12B may be a higher-bandwidth memory-sharing device such as a graphics processing unit (GPU), the second processor 12B may employ BTEs 90 with cache status entries 96 that track relatively coarse-grained groups of cache lines (e.g., each cache status entry 96 may correspond to 4 or more cache lines 100). In some embodiments, the same memory-sharing device (e.g., the processor 12A) may employ some BTEs 90 with relatively finer-grained cache status entries 96 and some BTEs 90 with relatively coarser-grained cache status entries 96.

Additionally or alternatively, in some embodiments, one or more of the memory-sharing devices (e.g., the first processor 12A) may employ BTEs 90 that dynamically track different-sized blocks of memory depending on changing conditions. For example, as shown by a contention diagram 400 of FIG. 24, BTEs 90 contained in the BTE tables 56A and 56B, respectively associated with the processors 12A and 12B, may track relatively fine or coarse blocks 401 of cache lines 100. Whether to track blocks of cache lines 100 in fine or coarse grains may depend on a degree of contention for cache lines 100 of that block 401 between the first processor 12A and the second processor 12B.

Figure 24:
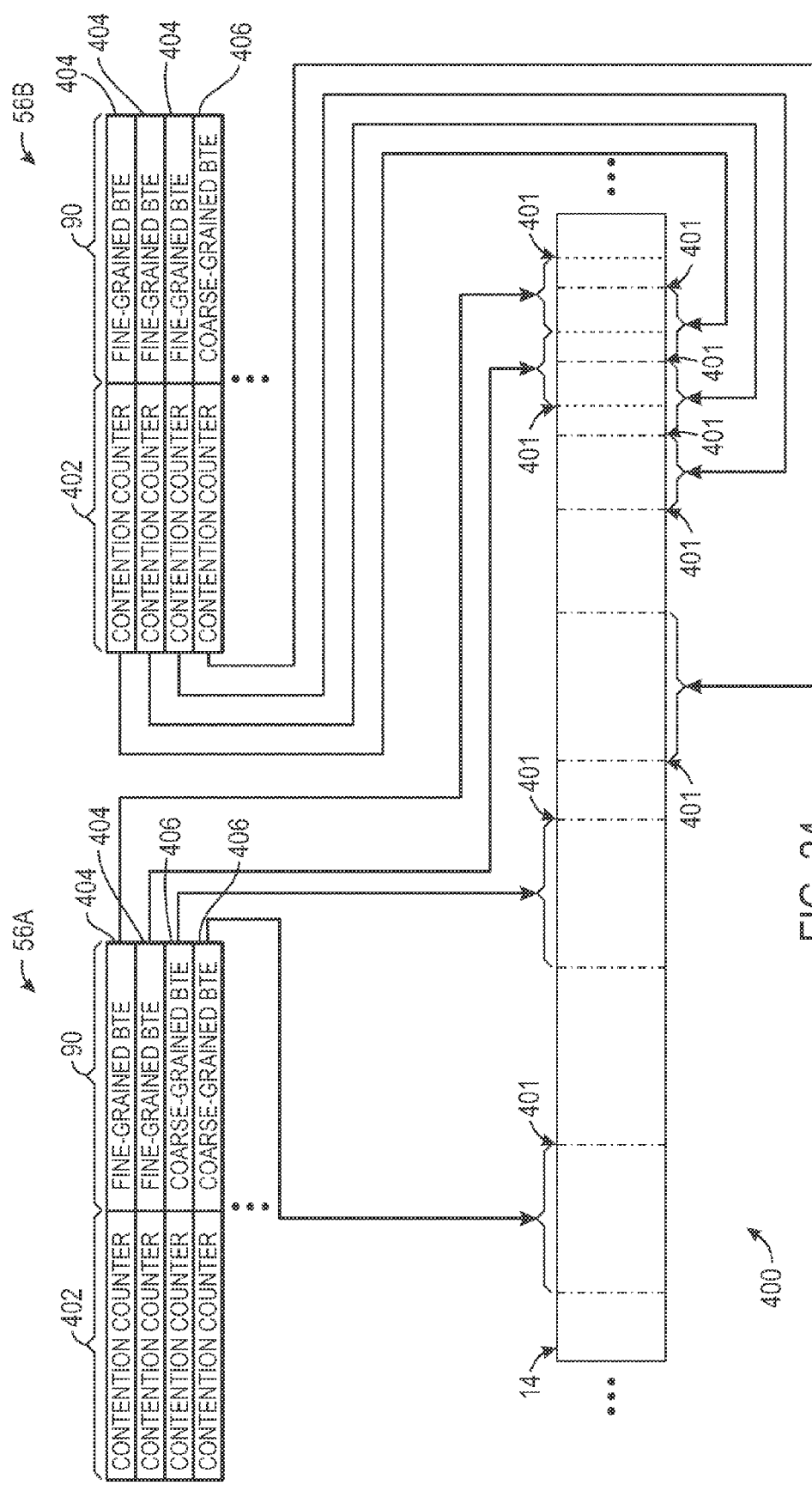
FIG. 24 is a schematic block diagram representing the use of contention counters to track coarser- or finer-grained groups of one or more cache lines depending on contention, in accordance with an embodiment.
Figure 25:
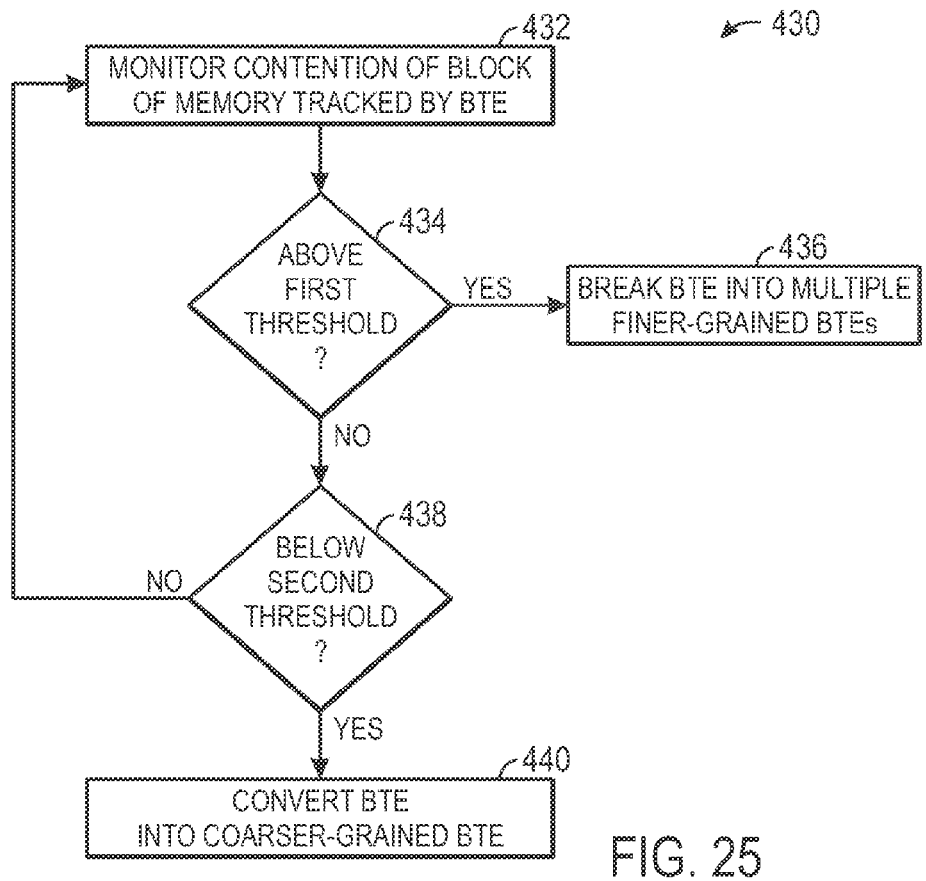
FIG. 25 is a flowchart describing an embodiment of a method for determining whether to track finer- or coarser-grained groups of one or more cache lines.

In some embodiments, a contention counter value 402 may be associated with each BTE 90 contained in the BTE tables 56A and 56B. When the first processor 12A is frequently accessing cache lines 100 from a block 401 also being accessed by the other processor 12B, the contention counter value 402 may be increased. When a contention counter value 402 exceeds some threshold, the BTE 90 it is associated with may track relatively finer-grained blocks 401 of cache lines 100, and otherwise may track relatively coarser-grained blocks 401 of cache lines 100. Thus, as indicated schematically in FIG. 24, areas of high contention between the processors 12A and 12B generally may be tracked by fine-grained BTEs 404. These fine-grained BTEs 404 may employ cache status entries 96 that track relatively smaller groupings of cache lines 100. Likewise, in areas of the shared memory 14 under less contention between the processors 12A and 12B, coarse-grained BTEs 406 may be employed to track the status of such memory. As should be appreciated, coarse-grained BTE 406 may employ cache status entries 96 that track relatively larger groupings of cache lines 100. For example, if the fine-grained BTE 404 includes cache status entries 96 that each track only one cache line 100, the coarse-grained BTE 406 may include cache status entries 96 that track two or more cache lines 100 per cache status entry 96. Although FIG. 24 illustrates only two types of BTEs 90 that respectively track the status of cache lines 100 at lower and higher granularities, respectively, any suitable number of granularities may be tracked by other BTEs 90. That is, in some embodiments, other BTEs 90 tracking intermediate granularities of blocks 401 of cache lines 100 may be employed.

A memory-sharing device, such as the first processor 12A, may vary the granularity of the BTEs 90 as contention changes. As noted above with reference to FIG. 24, contention counters 402 may be stored in the BTE table 56A along side the BTEs 90. As shown by a flowchart 430 of FIG. 25, the granularities tracked by the BTEs 90 may vary depending upon the degree to which the memory block tracked by a BTE 90 is under contention with another memory-sharing device.

Using the first processor 12A as an example, the flowchart 430 may begin as the first processor 12A monitors the contention of a block 401 of memory tracked by BTE 90 in the BTE table 56A (block 432). By way of example, contention counters 402 may store some value associated with the amount of contention relating to memory of a cache block 401 being tracked by the BTE 90. When the contention counters 402 associated with the BTE 90 fall above a first threshold (decision block 434), the BTE 90 may be broken into multiple, finer-grained BTEs 90 (block 436). For example, a coarse-grained BTE 406 whose contention counters 402 exceed the first threshold may be broken into two or more fine-grained BTEs 404, as appropriate. In another example, a BTE 90 with cache status entries 96 that each track two cache lines 100 may be broken into two BTEs having cache status entries 96 that each track one cache line 100. In certain embodiments, when a BTE 90 is broken into multiple finer-grained BTEs 90, as indicated in block 436, the contention counters 402 associated with each newly formed BTE 90 may be reset to some starting value, which may be incremented or decremented based on the contention of the block 401 of memory the BTE 90 subsequently tracks.

If the contention counters 402 associated with a BTE 90 are not above the first threshold (block 434), but are below some second threshold (decision block 438), the BTE 90 may be converted into a coarser-grained BTE 90 (block 440). In some embodiments, carrying out the conversion of block 440 may involve combining two BTEs 90 that track adjacent blocks 401 of memory, in which one or both have contention counters 402 that fall below the second threshold. To provide a few examples, one or more fine-grained BTEs 404 may be converted into a coarse-grained BTE 406 when the contention counters 402 indicate that the block of memory being tracked by the BTE(s) 90 is not under the threshold level of contention. For example, a BTE 90 having cache status entries 96 that each track one cache line 100 may be converted into a BTE 90 that has cache status entries 96 that each track two or more cache lines 100.

While the contention counters 402 associated with a BTE 90 remain below the first threshold (decision block 434) and above the second threshold (decision block 438), the level of contention associated with the block 401 of memory tracked by the BTE 90 may remain the same and continue to be monitored (block 432). In other words, the contention counters 402 associated with the BTE 90 may be incremented or decremented occasionally based the degree to which the block of memory is in contention between the first processor 12A and the second processor 12B.

Figure 26:
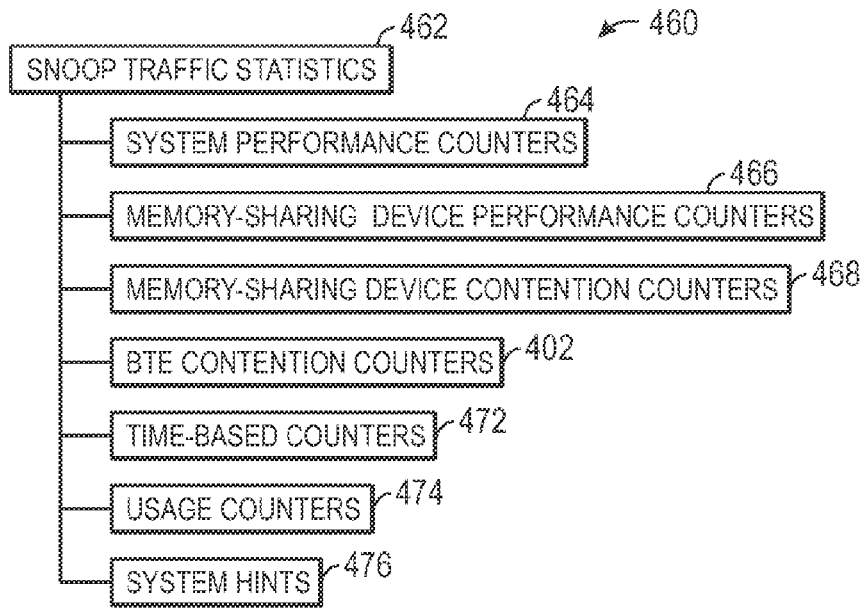
FIG. 26 is a snoop traffic statistics diagram illustrating various factors that may be used to vary the behavior of the cache coherence of the electronic device, in accordance with an embodiment.
Figure 27:
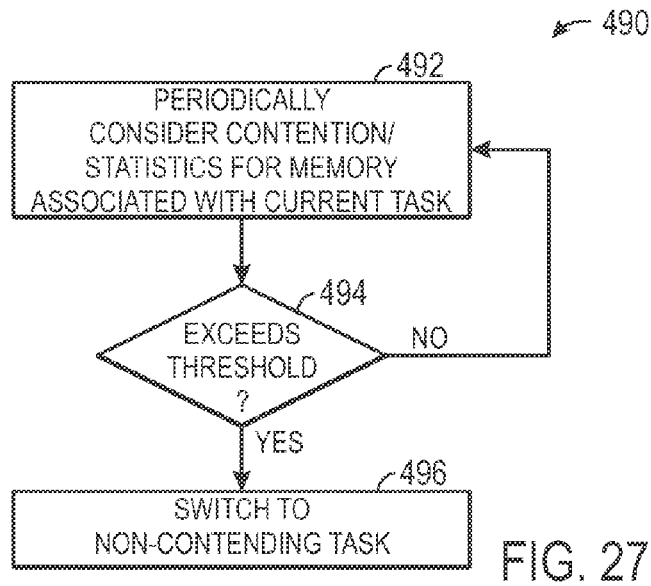
FIG. 27 is a flowchart describing an embodiment of a method that may be used to reduce contention between memory-sharing devices.

The contention counters 402 and/or other snoop traffic statistics may be used to vary the operation of the electronic device 10 to more efficiently maintain cache coherence using the snoop suppression block(s) 54. A snoop traffic statistics diagram 406 illustrated in FIG. 26 represents some snoop traffic statistics 462 that may be used to vary the operation of the electronic device 10 in this manner. For example, the snoop traffic statistics 462 may include system performance counters 464, which may relate to overall system performance of the electronic device 10; memory-sharing device performance counters 466, which may be specific to certain of the memory-sharing devices of the electronic device 10, such as the first processor 12A or the second processor 12B; memory-sharing device contention counters 468, which may relate to an overall degree to which a memory-sharing device of the electronic device 10 may be in contention (e.g., the first processor 12A) may be in contention with some other memory-sharing device of the electronic device 10 (e.g., the second processor 12B); the BTE contention counters 402, as discussed above; certain time-based counters 472; other usage counters 474, which may otherwise indicate a degree to which some component of the electronic device 10 is using resources of the electronic device 10; and/or other system hints 476, which may be, for example, policy hints or controls in page table flags, global registers, and so forth.

In general, one or more of the snoop traffic statistics 462 may be used by the snoop suppression block(s) 54 of the memory-sharing devices to control when, for example, to employ BTE snoop requests 84 rather than cache line snoop requests 80. Additionally or alternatively, the snoop traffic statistics 462 may be used to determine how conservatively a BTE 90 prepared in a BTE response 86 should list the cache lines 100 as no-line-snoop-required. In some embodiments, the snoop traffic statistics 462 may be used to identify when memory is to be handed over from one processor 12 (e.g., the first processor 12A) to another processor 12 (e.g., the second processor 12B) using processor-executable instructions (e.g., software or firmware) running on one or more of the processors 12. This handover of memory may also be reflected in the BTEs 90 of the processors 12 (e.g., the BTEs 90 of the second processor 12B may be updated because it may be known a priori that no snoop is required to access the memory newly under the control of the second processor 12B).

The electronic device 10 may also use the snoop traffic statistics 462 to reduce contention between its memory-sharing devices (e.g., the first processor 12A and the second processor 12B). For example, as shown by a flowchart 490 of FIG. 27, the data processing circuitry of the electronic device 10 may periodically consider the contention counters 402 and/or other snoop traffic statistics 462 for memory that may be associated with a first task (block 492). If the contention counters 402 and/or one or more of the snoop traffic statistics 462 exceeds some threshold (block 494), the processor 12 may switch to a second task, less-contending task (block 496), in an effort to reduce the current level of contention.

Figure 28:
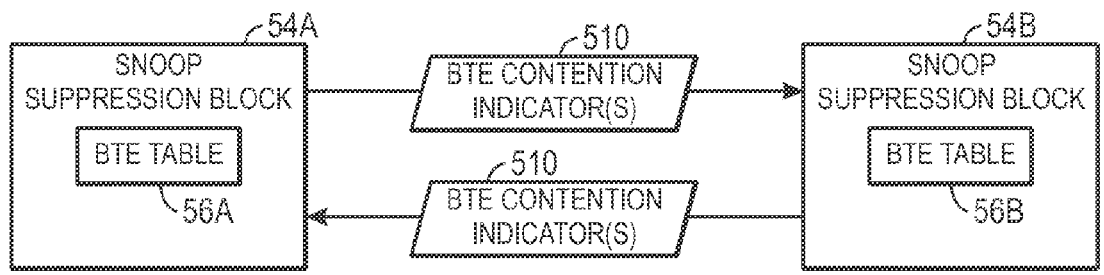
FIG. 28 is a schematic block diagram representing communication of contention indicators between snoop different memory-sharing devices, in accordance with an embodiment.

Contention for memory between two or more memory-sharing devices of the electronic device (e.g., the first processor 12A and the second processor 12B) also may be used to determine which memory-sharing device should be granted the right to use that memory. For example, in an embodiment represented by FIGS. 28 and 29, the processor 12 with a greater need for a particular block 401 of cache lines 100 may be given sole use of that block 401 for some period of time. As illustrated in FIG. 28, the snoop suppression blocks 54A and 54B that are respectively associated with the processors 12A and 12B may occasionally share snoop traffic statistics 462, such as one or more collections of contention counters 402 associated with BTEs 90 in their respective BTE tables 56A. This information is referred to in FIG. 28 as BTE contention indicator(s) 510, which may be exchanged between the snoop suppression block 54A and snoop suppression block 54B. It should be understood that the BTE contention indicator(s) 510 sent from the snoop suppression block 54A to the snoop suppression block 54B may relate particularly to the processor 12A, and the BTE contention indicator(s) 510 sent from the snoop suppression block 54B to the snoop suppression block 54A may relate particularly to the second processor 12B.

Figure 29:
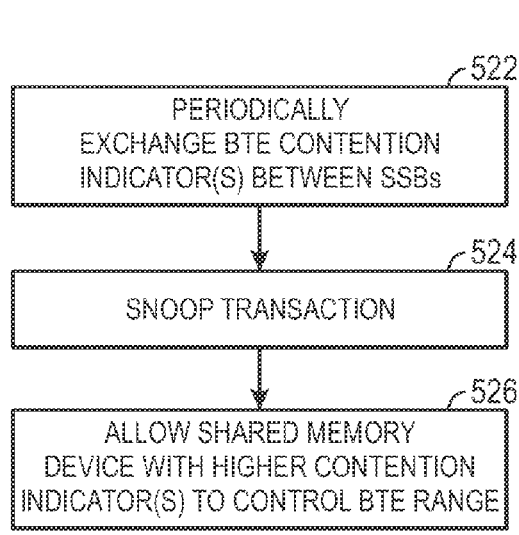
FIG. 29 is a flowchart describing an embodiment of a method for granting sole use over memory to a particular device depending on contention.

In a flowchart 520 of FIG. 29, these BTE contention indicator(s) 510 may be exchanged periodically or upon the occurrence of some event (e.g., entering a particular mode of operation) (block 522). Thereafter, when a snoop transaction occurs between the snoop suppression block 54A and snoop suppression block 54B (block 524), how the processors 12A and 12B carry out cache coherence may vary based at least partly on these BTE contention indicator(s) 510. For example, whether the processor 12A may respond to a cache line snoop request 80 with a cache line snoop response 82, a BTE response 86, or both, may vary depending on the BTE contention indicator(s) 510. In another example, whether the processor 12A or processor 12B will be granted access to a particular cache line 100 may depend upon the contention indicators 510 associated with that memory. Indeed, in some embodiments, after a snoop transaction between the snoop suppression block 54A and the snoop suppression block 54B occurs (block 524), the first processor 12A may be granted access and/or sole use of a cache line 100 requested in a snoop request.

Technical effects of the present disclosure include increased efficiency for an electronic device that maintains cache coherence between two memory-sharing devices. Such efficiency may be particularly magnified when at least one such memory-sharing device operates on a relatively high-bandwidth of memory, such as a graphics processing unit (GPU). By reducing certain unnecessary snoop transactions between two memory-sharing devices, an electronic device may operate more quickly and/or with less power, allowing battery life to be improved and/or less power to be generated in order to charge the electronic device, as well as allowing the electronic device to operate perceptibly faster.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A processor comprising:
   one or more processor cores configured to operate on cache lines from memory shared by another memory-sharing device;
   one or more caches configured to store a plurality of the cache lines;
   cache snoop circuitry comprising a table of cache block tracking entries, wherein each of the cache block tracking entries comprises a respective plurality of cache status entries, wherein each cache status entry respectively tracks a status of one or more of the cache lines, and wherein the cache snoop circuitry is configured, when one of the one or more processor cores requests one of the cache lines, to determine whether to issue a snoop request to the other memory-sharing device based at least in part on the table of cache block tracking entries; and
   a cache block coherence interface communicably interposed between the one or more processor cores and the another memory-sharing device, the cache block coherence interface having associated therewith a second table of cache block tracking entries, each block tracking entry of the second table of cache block tracking entries respectively tracking a possibly-shared status of each of a plurality of groups of one or more cache lines of a different block of memory, wherein the cache block coherence interface is configured to attempt to maintain cache coherence between the another memory-sharing device and the one or more processor cores based at least in part on the second table of cache block tracking entries.

2. The processor of claim 1, wherein the cache snoop circuitry is configured to determine to issue the snoop request to the other memory-sharing device when:
  a valid one of the plurality of cache status entries of one of the cache block tracking entries corresponds to the requested cache line and indicates the status of the requested cache line as possibly in use by the other memory-sharing device; or
  no valid one of the plurality of cache status entries of any of the cache block tracking entries corresponds to the requested cache line.

3. The processor of claim 1, wherein the cache snoop circuitry is configured to determine not to issue the snoop request to the other memory-sharing device when one of the plurality of cache status entries of one of the cache block tracking entries corresponds to the requested cache line and indicates the status of the requested cache line as not possibly in use by the other memory-sharing device.

4. The processor of claim 1, wherein each plurality of cache status entries tracks statuses of a block of cache lines.

5. The processor of claim 1, wherein at least one cache status entry tracks a status of one cache line, wherein the status indicates whether the cache line is possibly in use by the other memory-sharing device.

6. The processor of claim 1, wherein at least one cache status entry tracks a status of two or more cache lines, wherein the status indicates whether at least one of the two or more cache lines is possibly in use by the other memory-sharing device.

7. The processor of claim 1, wherein each cache status entry comprises a single bit.

8. A system comprising:
  two or more memory-sharing devices, each of the two or more memory-sharing devices respectively comprising a cache and a first table of block tracking entries, each of the block tracking entries of the table of block tracking entries being configured to track respective statuses of groups of cache lines of a block of memory;
  a memory device configured to be shared by the two or more memory-sharing devices;
  a communication bus configured to enable the two or more memory-sharing devices to issue snoop requests to one another; and
  a cache block coherence interface communicably interposed between the two or more memory-sharing devices, the cache block coherence interface having associated therewith a second table of cache block tracking entries, each block tracking entry of the second table of cache block tracking entries respectively tracking a possibly-shared status of each of a plurality of groups of one or more cache lines of a different block of memory, wherein the cache block coherence interface is configured to attempt to maintain cache coherence between the two or more memory-sharing devices based at least in part on the second table of cache block tracking entries;
  wherein each of the two or more memory-sharing devices is configured, upon receipt of a snoop request for a cache line not present in its cache, to issue a response comprising a block tracking entry that indicates respective statuses of groups of cache lines of a block of memory to which the requested cache line belongs, wherein the respective statuses of the groups of cache lines of the block of memory to which the requested cache line belongs are determined based at least in part on whether the cache lines of the block of memory to which the requested cache line belongs are present in its cache.

9. The system of claim 8, wherein each of the two or more memory-sharing devices is configured, upon receipt of the snoop request for the cache line not present in its cache, to issue the response, wherein the response consists of the block tracking entry that indicates respective statuses of groups of cache lines of the block of memory to which the requested cache line belongs, and wherein the response is the same size as the communication bus.

10. The system of claim 9, wherein each of the two or more memory-sharing devices is configured, upon receipt of a snoop request for a cache line present in its cache, to issue a response that comprises the requested cache line, wherein the response is the same size as the communication bus.

11. The system of claim 8, wherein each of the two or more memory-sharing devices is configured, upon receipt of a snoop request for a cache line present in its cache, to issue a first response comprising the requested cache line and a second response comprising a block tracking entry that indicates respective statuses of groups of cache lines of a block of memory to which the requested cache line belongs, wherein the respective statuses of the groups of cache lines of the block of memory to which the requested cache line belongs are determined based at least in part on whether the cache lines of the block of memory to which the requested cache line belongs are present in its cache.

12. The system of claim 8, wherein each of the two or more memory-sharing devices is configured, upon receipt of a snoop request for a cache line present in its cache, to issue a first response comprising the requested cache line and a second response comprising a block tracking entry that indicates respective statuses of groups of cache lines of a block of memory to which the requested cache line belongs, wherein the respective statuses of the groups of cache lines of the block of memory to which the requested cache line belongs are determined based at least in part on a counted Bloom filter, another filter, or a filter-hierarchy that includes similar properties to the cache lines present in its cache.

13. A system comprising:
  a memory device configured to store shared cache lines;
  a central processing unit configured to operate on the shared cache lines of the memory device, the central processing unit having associated therewith a first table of cache block tracking entries, each block tracking entry of the first table of cache block tracking entries respectively tracking a possibly-shared status of each of a plurality of groups of one or more cache lines of a different block of memory; and
  another memory-sharing device configured to operate on the shared cache lines of the memory device;
  wherein the central processing unit is configured to attempt to maintain cache coherence with the other memory-sharing device upon based at least in part on the first table of cache block tracking entries, wherein each block tracking entry of the first table of block tracking entries is configured to provide an indication of an amount of contention between the central processing unit and the other memory-sharing device for cache lines in the block of memory tracked by that block tracking entry, and a size of the block of memory respectively tracked by one of the block tracking entries of the first table of block tracking entries depends on the indication of the amount of contention provided by the one of the block tracking entries.

14. The system of claim 13, comprising a cache block coherence interface communicably interposed between the central processing unit and the other memory-sharing device, the cache block coherence interface having associated therewith a second table of cache block tracking entries, each block tracking entry of the second table of cache block tracking entries respectively tracking a possibly-shared status of each of a plurality of groups of one or more cache lines of a different block of memory, wherein the cache block coherence interface is configured to attempt to maintain cache coherence between the other memory-sharing device and the central processing unit based at least in part on the second table of cache block tracking entries.

15. The system of claim 14, wherein the cache block coherence interface is configured, upon a cache miss in the other memory-sharing device, to suppress a snoop request from the other memory-sharing device when a valid block tracking entry of the second table of block tracking entries indicates that no cache line snoop of the cache line is required to maintain cache coherence with the central processing unit.

16. The system of claim 13, wherein one of the block tracking entries of the first table of block tracking entries is configured to track a relatively smaller block of memory, when the indication of the amount of contention provided by the one of the block tracking entries exceeds a threshold, than otherwise.

17. The system of claim 13, wherein one of the block tracking entries of the first table of block tracking entries is configured to track the possibly-shared status of each of the plurality of groups of one or more cache lines of the block of memory tracked by the one of the block tracking entries, wherein each of the plurality of groups of one or more cache lines is relatively smaller, when the indication of the amount of contention provided by the one of the block tracking entries exceeds a threshold, than otherwise.

18. A method comprising:
upon a cache miss of a desired cache line in a first processor of an electronic device, issuing a snoop request from the first processor to a second processor of the electronic device unless a valid block tracking entry of a first table of block tracking entries associated with the first processor, the valid block tracking entry tracking a block of memory that includes the desired cache line by way of a plurality of cache status entries each respectively associated with one or more cache lines of the block of memory, includes a cache status entry associated with the desired cache line that indicates that no snoop request is necessary to maintain cache coherence with the second processor; and
determining in the first processor whether the second processor has not returned a response to the snoop request within a threshold amount of time and, when the second processor has not returned the response to the snoop request within the threshold amount of time, updating the first table of block tracking entries to indicate that all cache lines in a block of memory that includes the desired cache line should require a snoop request before being accessed.

19. The method of claim 18, wherein issuing the snoop request comprises issuing a cache line snoop request associated with the desired cache line or a request for a block tracking entry associated with the desired cache line, or both.

20. The method of claim 18, comprising, when the snoop request is issued, receiving the snoop request in the second processor and responding to the snoop request with a block tracking entry having cache status entries that indicate that a snoop request should be issued for any cache lines corresponding to uncached cache lines in use by the second processor in a block of memory that overlaps with the snoop request.

21. The method of claim 18, wherein the snoop request is configured to grant sole use of the desired cache line to the first processor, and comprising updating the first table of block tracking entries to indicate that no snoop request for the desired cache line is necessary to maintain cache coherence with the second processor.

22. The method of claim 18, wherein the snoop request is configured to grant sole use of a block of memory to which the desired cache line belongs to the first processor, and comprising updating the first table of block tracking entries to indicate that no snoop request for any cache lines in the block of memory to which the desired cache line belongs is necessary to maintain cache coherence with the second processor.

23. The method of claim 18, comprising issuing a request, from the first processor to the second processor, for a block tracking entry associated with the desired cache line when the first processor expects to attempt to access the desired cache line in the future and before the cache miss of the desired cache line.

24. The method of claim 18, comprising, when the snoop request is issued for the desired cache line, receiving the snoop request in the second processor and updating a second table of block tracking entries associated with the second processor.

25. The method of claim 24, wherein the second table of block tracking entries is updated by marking a cache status entry associated with the desired cache line of one of the block tracking entries of the second table of block tracking entries to indicate that that another snoop request for the desired cache line might be necessary to maintain cache coherence with the first processor.

26. The method of claim 24, wherein the second table of block tracking entries is updated by marking all cache status entries of block tracking entries of the second table of block tracking entries that correspond to uncached cache lines that overlap with the snoop request to indicate that that another snoop request for any of the uncached cache lines that overlap with the snoop request might be necessary to maintain cache coherence with the first processor.

27. The method of claim 18, comprising, when the snoop request is issued, receiving the snoop request in the second processor and updating a cache associated with the second processor based at least in part on the snoop request.

28. The method of claim 27, wherein updating the cache associated with the second processor comprises invalidating any unmodified cache lines that overlap with the snoop request.

* * * * *